United States Patent
de Castro Alves et al.

(10) Patent No.: US 9,712,645 B2
(45) Date of Patent: Jul. 18, 2017

(54) EMBEDDED EVENT PROCESSING

(71) Applicant: Oracle International Corporation, Redwood Shores, CA (US)

(72) Inventors: Alexandre de Castro Alves, Doral, FL (US); Prabish Kumar, Bangalore (IN); Yathish Gatty, Bangalore (IN); Ashish Mahendru, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 256 days.

(21) Appl. No.: 14/610,971

(22) Filed: Jan. 30, 2015

(65) Prior Publication Data

US 2015/0381712 A1 Dec. 31, 2015

Related U.S. Application Data

(60) Provisional application No. 62/017,736, filed on Jun. 26, 2014.

(51) Int. Cl.
G06F 15/16 (2006.01)
H04L 29/08 (2006.01)
G06F 17/30 (2006.01)

(52) U.S. Cl.
CPC ........ H04L 67/34 (2013.01); G06F 17/30516 (2013.01); H04L 67/26 (2013.01); H04L 67/303 (2013.01)

(58) Field of Classification Search
USPC .......... 709/205, 210, 213; 345/411; 310/316
See application file for complete search history.

(56) References Cited

U.S. PATENT DOCUMENTS

| | | |
|---|---|---|
| 4,996,687 A | 2/1991 | Hess et al. |
| 5,051,947 A | 9/1991 | Messenger et al. |
| 5,339,392 A | 8/1994 | Risberg et al. |
| 5,495,600 A | 2/1996 | Terry et al. |
| 5,706,494 A | 1/1998 | Cochrane et al. |
| 5,802,262 A | 9/1998 | Van De Vanter |
| 5,802,523 A | 9/1998 | Jasuja et al. |
| 5,822,750 A | 10/1998 | Jou et al. |

(Continued)

FOREIGN PATENT DOCUMENTS

| | | |
|---|---|---|
| CN | 101866353 | 10/2010 |
| CN | 102135984 | 7/2011 |

(Continued)

OTHER PUBLICATIONS

Chui, WebSphere Application Server V6.1—Class loader problem determination, IBM.com, 2007.

(Continued)

*Primary Examiner* — Tammy Nguyen
(74) *Attorney, Agent, or Firm* — Kilpatrick Townsend & Stockton LLP

(57) ABSTRACT

Techniques for embedded event processing are provided. In some examples, instructions for executing at least a subset of complex event processing features may be received. A stream of events received by the edge computing device may be identified. Additionally, the events of the stream utilizing the subset of complex event processing features may be processed. Further, in some aspects, the processed events may be provided to a complex event platform of a server.

18 Claims, 9 Drawing Sheets

(56) References Cited

U.S. PATENT DOCUMENTS

| | | |
|---|---|---|
| 5,826,077 A | 10/1998 | Blakeley et al. |
| 5,850,544 A | 12/1998 | Parvathaneny et al. |
| 5,857,182 A | 1/1999 | Demichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas et al. |
| 6,006,235 A | 12/1999 | MacDonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,212,673 B1 | 4/2001 | House et al. |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray et al. |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sarkar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,633,867 B1 | 10/2003 | Kraft et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,904,019 B2 | 6/2005 | Heinen et al. |
| 6,905,019 B2 * | 6/2005 | Lacomis .............. B65D 85/546 206/308.1 |
| 6,985,904 B1 | 1/2006 | Kaluskar et al. |
| 6,986,019 B1 | 1/2006 | Bagashev et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,284,041 B2 * | 10/2007 | Nakatani .......... G06F 17/30067 707/E17.01 |
| 7,305,391 B2 | 12/2007 | Wyschogrod et al. |
| 7,308,561 B2 | 12/2007 | Cornet et al. |
| 7,310,638 B1 | 12/2007 | Blair |
| 7,348,981 B1 | 3/2008 | Buck |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,440,461 B2 | 10/2008 | Sahita et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,526,804 B2 | 4/2009 | Shelest et al. |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor et al. |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,818,313 B1 | 10/2010 | Tsimelzon |
| 7,823,066 B1 | 10/2010 | Kuramura |
| 7,827,146 B1 | 11/2010 | De Landstheer et al. |
| 7,827,190 B2 | 11/2010 | Pandya et al. |
| 7,844,829 B2 | 11/2010 | Meenakshisundaram |
| 7,870,124 B2 | 1/2011 | Liu et al. |
| 7,870,167 B2 | 1/2011 | Lu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | MacLennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,984,043 B1 | 7/2011 | Waas |
| 7,987,204 B2 | 7/2011 | Stokes |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,099,400 B2 | 1/2012 | Haub et al. |
| 8,122,006 B2 | 2/2012 | De Castro Alves et al. |
| 8,134,184 B2 | 3/2012 | Becker et al. |
| 8,145,686 B2 | 3/2012 | Raman et al. |
| 8,145,859 B2 | 3/2012 | Park et al. |
| 8,155,880 B2 | 4/2012 | Patel et al. |
| 8,190,738 B2 | 5/2012 | Ruehle |
| 8,195,648 B2 | 6/2012 | Zabback et al. |
| 8,204,873 B2 | 6/2012 | Chavan |
| 8,260,803 B2 | 9/2012 | Hsu et al. |
| 8,290,776 B2 | 10/2012 | Moriwaki et al. |
| 8,296,316 B2 | 10/2012 | Jain et al. |
| 8,307,197 B2 | 11/2012 | Koch, III |
| 8,307,343 B2 | 11/2012 | Chaudhuri et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,346,511 B2 | 1/2013 | Schoning et al. |
| 8,352,517 B2 | 1/2013 | Park et al. |

(56) References Cited

U.S. PATENT DOCUMENTS

| | | |
|---|---|---|
| 8,370,812 B2 | 2/2013 | Feblowitz et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,396,886 B1 | 3/2013 | Tsimelzon |
| 8,447,744 B2 | 5/2013 | Alves et al. |
| 8,458,175 B2 | 6/2013 | Stokes |
| 8,498,956 B2 | 7/2013 | Srinivasan et al. |
| 8,527,458 B2 | 9/2013 | Park et al. |
| 8,572,589 B2 | 10/2013 | Cataldo et al. |
| 8,589,436 B2 | 11/2013 | Srinivasan et al. |
| 8,595,840 B1 | 11/2013 | Malibiran et al. |
| 8,676,841 B2 | 3/2014 | Srinivasan et al. |
| 8,713,049 B2 | 4/2014 | Jain et al. |
| 8,719,207 B2 | 5/2014 | Ratnam et al. |
| 8,745,070 B2 | 6/2014 | Krisnamurthy |
| 8,762,369 B2 | 6/2014 | Macho et al. |
| 9,015,102 B2 | 4/2015 | van Lunteren |
| 9,047,249 B2 | 6/2015 | de Castro Alves et al. |
| 9,058,360 B2 | 6/2015 | De Castro Alves et al. |
| 9,098,587 B2 | 8/2015 | Deshmukh et al. |
| 9,110,945 B2 | 8/2015 | Jain |
| 9,189,280 B2 | 11/2015 | Park et al. |
| 9,244,978 B2 | 1/2016 | Alves et al. |
| 9,256,646 B2 | 2/2016 | Deshmukh et al. |
| 9,262,258 B2 | 2/2016 | Alves et al. |
| 9,262,479 B2 | 2/2016 | Deshmukh et al. |
| 9,286,352 B2 * | 3/2016 | Park ................ G06F 17/30442 |
| 9,292,574 B2 | 3/2016 | Hsiao et al. |
| 9,305,057 B2 | 4/2016 | De Castro Alves et al. |
| 9,305,238 B2 | 4/2016 | Srinivasan et al. |
| 9,329,975 B2 | 5/2016 | Park et al. |
| 9,361,308 B2 | 6/2016 | Deshmukh et al. |
| 9,390,135 B2 | 7/2016 | Alves et al. |
| 9,418,113 B2 | 8/2016 | Bishnoi et al. |
| 9,430,494 B2 | 8/2016 | Park et al. |
| 9,535,761 B2 * | 1/2017 | Park ..................... G06F 9/5027 |
| 9,563,663 B2 | 2/2017 | Shukla et al. |
| 2002/0023211 A1 | 2/2002 | Roth et al. |
| 2002/0032804 A1 | 3/2002 | Hunt |
| 2002/0038306 A1 | 3/2002 | Griffin et al. |
| 2002/0038313 A1 | 3/2002 | Klein et al. |
| 2002/0049788 A1 | 4/2002 | Lipkin et al. |
| 2002/0056004 A1 | 5/2002 | Smith et al. |
| 2002/0073399 A1 | 6/2002 | Golden |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0014408 A1 | 1/2003 | Robertson |
| 2003/0037048 A1 | 2/2003 | Kabra et al. |
| 2003/0046673 A1 | 3/2003 | Copeland et al. |
| 2003/0065655 A1 | 4/2003 | Syeda-mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0212664 A1 | 11/2003 | Breining et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0243590 A1 | 12/2004 | Gu et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0027698 A1 * | 2/2005 | Collet ................ G06F 17/30522 |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0108368 A1 | 5/2005 | Mohan |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0192921 A1 | 9/2005 | Chaudhuri et al. |
| 2005/0204340 A1 | 9/2005 | Ruminer et al. |
| 2005/0229158 A1 | 10/2005 | Thusoo et al. |
| 2005/0273352 A1 | 12/2005 | Moffat et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100957 A1 | 5/2006 | Buttler et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1 | 6/2006 | Suyama et al. |
| 2006/0155719 A1 | 7/2006 | Mihaeli et al. |
| 2006/0166704 A1 | 7/2006 | Benco et al. |
| 2006/0167704 A1 | 7/2006 | Nicholls et al. |
| 2006/0167856 A1 | 7/2006 | Angele et al. |
| 2006/0167869 A1 * | 7/2006 | Jones ................ G06F 17/30929 |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | Von Kaenel et al. |
| 2007/0076314 A1 | 4/2007 | Rigney |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156787 A1 | 7/2007 | MacGregor |
| 2007/0156964 A1 | 7/2007 | Sistla |
| 2007/0192301 A1 | 8/2007 | Posner |
| 2007/0198479 A1 | 8/2007 | Cai et al. |
| 2007/0214171 A1 | 9/2007 | Behnen |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | McGoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1 | 3/2008 | Schuba et al. |
| 2008/0077570 A1 | 3/2008 | Tang et al. |
| 2008/0077587 A1 | 3/2008 | Wyschogrod et al. |
| 2008/0077780 A1 | 3/2008 | Zingher |
| 2008/0082484 A1 | 4/2008 | Averbuch et al. |
| 2008/0082514 A1 | 4/2008 | Khorlin et al. |

(56) References Cited

U.S. PATENT DOCUMENTS

| | | |
|---|---|---|
| 2008/0086321 A1 | 4/2008 | Walton |
| 2008/0098359 A1 | 4/2008 | Ivanov et al. |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0275891 A1 | 11/2008 | Park et al. |
| 2008/0281782 A1 | 11/2008 | Agrawal |
| 2008/0301086 A1 | 12/2008 | Gupta |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | McWilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112779 A1 | 4/2009 | Wolf et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0125916 A1 | 5/2009 | Lu et al. |
| 2009/0132503 A1 | 5/2009 | Sun |
| 2009/0133041 A1 | 5/2009 | Rahman et al. |
| 2009/0144696 A1 | 6/2009 | Andersen |
| 2009/0172014 A1 | 7/2009 | Huetter |
| 2009/0182779 A1 | 7/2009 | Johnson |
| 2009/0187584 A1 | 7/2009 | Johnson et al. |
| 2009/0192981 A1 | 7/2009 | Papaemmanouil et al. |
| 2009/0216747 A1 | 8/2009 | Li et al. |
| 2009/0216860 A1 | 8/2009 | Li et al. |
| 2009/0222730 A1 | 9/2009 | Wixson et al. |
| 2009/0228431 A1 | 9/2009 | Dunagan et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |
| 2009/0257314 A1 | 10/2009 | Davis et al. |
| 2009/0265324 A1 | 10/2009 | Mordvinov et al. |
| 2009/0271529 A1 | 10/2009 | Kashiyama et al. |
| 2009/0282021 A1 | 11/2009 | Bennett et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo |
| 2009/0319501 A1 | 12/2009 | Goldstein et al. |
| 2009/0327102 A1 | 12/2009 | Maniar et al. |
| 2009/0327257 A1 | 12/2009 | Abouzeid et al. |
| 2010/0017379 A1 | 1/2010 | Naibo et al. |
| 2010/0017380 A1 | 1/2010 | Naibo et al. |
| 2010/0022627 A1 | 1/2010 | Scherer et al. |
| 2010/0023498 A1 | 1/2010 | Dettinger et al. |
| 2010/0036803 A1 | 2/2010 | Vemuri et al. |
| 2010/0036831 A1 | 2/2010 | Vemuri |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1 | 3/2010 | Srinivasan et al. |
| 2010/0094838 A1 | 4/2010 | Kozak |
| 2010/0106710 A1 | 4/2010 | Nishizawa et al. |
| 2010/0106946 A1 | 4/2010 | Imaki et al. |
| 2010/0125572 A1 | 5/2010 | Poblete et al. |
| 2010/0125574 A1 | 5/2010 | Navas |
| 2010/0125584 A1 | 5/2010 | Navas |
| 2010/0138405 A1 | 6/2010 | Mihaila |
| 2010/0161589 A1 | 6/2010 | Nica et al. |
| 2010/0223283 A1 | 9/2010 | Lee et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0250572 A1 | 9/2010 | Chen |
| 2010/0293135 A1 | 11/2010 | Candea et al. |
| 2010/0312756 A1 | 12/2010 | Zhang et al. |
| 2010/0318652 A1 | 12/2010 | Samba |
| 2010/0332401 A1 | 12/2010 | Prahlad et al. |
| 2011/0004621 A1 | 1/2011 | Kelley et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0035253 A1* | 2/2011 | Mason .................. G06Q 10/06 705/7.13 |
| 2011/0040746 A1 | 2/2011 | Handa et al. |
| 2011/0055192 A1 | 3/2011 | Tang et al. |
| 2011/0084967 A1 | 4/2011 | De Pauw et al. |
| 2011/0093162 A1 | 4/2011 | Nielsen et al. |
| 2011/0105857 A1 | 5/2011 | Zhang et al. |
| 2011/0131588 A1 | 6/2011 | Allam et al. |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196839 A1 | 8/2011 | Smith et al. |
| 2011/0196891 A1 | 8/2011 | De Castro et al. |
| 2011/0246445 A1 | 10/2011 | Mishra |
| 2011/0270879 A1 | 11/2011 | Srinivasan et al. |
| 2011/0282812 A1 | 11/2011 | Chandramouli et al. |
| 2011/0302164 A1 | 12/2011 | Krishnamurthy et al. |
| 2011/0313844 A1 | 12/2011 | Chandramouli et al. |
| 2011/0314019 A1 | 12/2011 | Jimenez Peris et al. |
| 2011/0321057 A1 | 12/2011 | Mejdrich et al. |
| 2012/0016866 A1 | 1/2012 | Dunagan |
| 2012/0041934 A1 | 2/2012 | Srinivasan et al. |
| 2012/0072455 A1 | 3/2012 | Jain et al. |
| 2012/0116982 A1 | 5/2012 | Yoshida et al. |
| 2012/0130963 A1 | 5/2012 | Luo et al. |
| 2012/0131139 A1 | 5/2012 | Siripurapu et al. |
| 2012/0166417 A1 | 6/2012 | Chandramouli et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0031567 A1 | 1/2013 | Nano et al. |

(56) References Cited

U.S. PATENT DOCUMENTS

| | | |
|---|---|---|
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0262399 A1 | 10/2013 | Eker et al. |
| 2013/0275452 A1 | 10/2013 | Krishnamurthy et al. |
| 2013/0332240 A1 | 12/2013 | Patri et al. |
| 2014/0019194 A1 | 1/2014 | Anne et al. |
| 2014/0059109 A1 | 2/2014 | Jugel et al. |
| 2014/0082013 A1 | 3/2014 | Wolf et al. |
| 2014/0095425 A1 | 4/2014 | Sipple et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172506 A1 | 6/2014 | Parsell et al. |
| 2014/0172914 A1 | 6/2014 | Elnikety et al. |
| 2014/0201225 A1 | 7/2014 | Deshmukh et al. |
| 2014/0201355 A1 | 7/2014 | Bishnoi et al. |
| 2014/0236983 A1 | 8/2014 | de Castro Alves |
| 2014/0237289 A1 | 8/2014 | de Castro Alves et al. |
| 2014/0324530 A1* | 10/2014 | Thompson ......... G06Q 30/0201 705/7.29 |
| 2014/0379712 A1 | 12/2014 | Lafuente Alvarez |
| 2015/0007320 A1 | 1/2015 | Liu et al. |
| 2015/0156241 A1 | 6/2015 | Shukla et al. |
| 2015/0161214 A1 | 6/2015 | Kali et al. |
| 2015/0227415 A1 | 8/2015 | Alves et al. |
| 2015/0363464 A1 | 12/2015 | Alves et al. |
| 2015/0381712 A1 | 12/2015 | De Castro Alves et al. |
| 2016/0034311 A1 | 2/2016 | Park et al. |
| 2016/0085809 A1 | 3/2016 | De Castro et al. |
| 2016/0085810 A1 | 3/2016 | De Castro et al. |
| 2016/0103882 A1 | 4/2016 | Deshmukh et al. |
| 2016/0140180 A1 | 5/2016 | Park et al. |
| 2016/0154855 A1 | 6/2016 | Hsiao et al. |
| 2016/0283555 A1 | 9/2016 | Alves et al. |
| 2017/0024912 A1* | 1/2017 | de Castro Alves ... G06T 11/206 |

FOREIGN PATENT DOCUMENTS

| | | |
|---|---|---|
| CN | 102665207 | 9/2012 |
| CN | 102892073 | 1/2013 |
| CN | 104885077 | 9/2015 |
| CN | 104937591 | 9/2015 |
| CN | 105593854 | 5/2016 |
| EP | 1241589 | 9/2002 |
| EP | 2474922 | 7/2012 |
| EP | 2946314 | 11/2015 |
| EP | 2946527 | 11/2015 |
| EP | 2959408 | 12/2015 |
| JP | 2015536001 | 12/2015 |
| JP | 2016500167 | 1/2016 |
| WO | 0049533 | 8/2000 |
| WO | 0118712 | 3/2001 |
| WO | 0159602 | 8/2001 |
| WO | 0165418 | 9/2001 |
| WO | 03030031 | 4/2003 |
| WO | 2007122347 | 11/2007 |
| WO | 2009119811 | 10/2009 |
| WO | 2012037511 | 3/2012 |
| WO | 2012050582 | 4/2012 |
| WO | 2012154408 | 11/2012 |
| WO | 2012158360 | 11/2012 |
| WO | 2014000819 | 1/2014 |
| WO | 2014193943 | 12/2014 |
| WO | 2015191120 | 12/2015 |
| WO | 2016048912 | 3/2016 |

OTHER PUBLICATIONS

Cranor et al., Gigascope: a stream database for network applications, Proceedings of the 2003 Acm Sigmod International Conference on Management of Data ' SIGMOD '03, Jun. 9, 2003, pp. 647-651.

De Castro Alves, A General Extension System for Event Processing Languages, DEBS '11, New York, NY, USA, Jul. 11-15, 2011, pp. 1-9.

European Application No. 12783063.6, Extended European Search Report mailed on Mar. 24, 2015, 6 pages.

International Application No. PCT/US2014/010832, Written Opinion mailed on Dec. 15, 2014, 5 pages.

International Application No. PCT/US2014/017061, Written Opinion mailed on Feb. 3, 2015, 6 pages.

International Application No. PCT/US2014/039771, International Search Report and Written Opinion mailed on Sep. 24, 2014, 12 pages.

International Application No. PCT/US2014/068641, International Search Report and Written Opinion mailed on Feb. 26, 2015, 11 pages.

Oracle® Complex Event Processing EPL Language Reference 11g Release 1 (11.1.1.4.0), E14304-02, Jan. 2011, 80 pages.

OracleTM Complex Event Processing CQL Language Reference, 11g Release 1(11.1.1) E12048-03, Apr. 2010, pp. 18-1 to 18.9.5.

Takenaka et al., A scalable complex event processing framework for combination of SQL-based continuous queries and C/C++ functions, FPL 2012, Oslo, Norway, Aug. 29-31, 2012, pp. 237-242.

Tomàs et al., RoSeS: A Continuous Content-Based Query Engine for RSS Feeds, DEXA 2011, Toulouse, France, Sep. 2, 2011, pp. 203-218.

WebLogic Event Server Reference, BEA WebLogic Event Server, Version. 2.0, Jul. 2007, 52 pages.

Weblogic Server Performance and Tuning, BEA WebLogic Server, Ver. 10.0, Mar. 30, 2007, 180 pages.

U.S. Appl. No. 12/913,636, Non-Final Office Action mailed on Apr. 1, 2015, 22 pages.

U.S. Appl. No. 13/764,560, Final Office Action mailed on Apr. 15, 2015, 19 pages.

U.S. Appl. No. 13/827,631, Final Office Action mailed on Apr. 3, 2015, 11 pages.

U.S. Appl. No. 13/830,129, Non-Final Office Action mailed on Feb. 27, 2015, 19 pages.

U.S. Appl. No. 13/830,378, Non-Final Office Action mailed on Feb. 25, 2015, 23 pages.

U.S. Appl. No. 13/839,288, Notice of Allowance mailed on Apr. 3, 2015, 12 pages.

U.S. Appl. No. 14/077,230, Notice of Allowance mailed on Apr. 16, 2015, 16 pages.

Final Office Action for U.S. Appl. No. 14/302,031 dated Apr. 22, 2015, 23 pages.

Non-Final Office Action for U.S. Appl. No. 14/692,674 dated Jun. 5, 2015, 22 pages.

Non-Final Office Action for U.S. Appl. No. 14/037,171 dated Jun. 3, 2015, 15 pages.

Non-Final Office Action for U.S. Appl. No. 14/830,735 dated May 26, 2015, 19 pages.

Final Office Action for U.S. Appl. No. 13/830,428 dated Jun. 4, 2015, 21 pages.

Non-Final Office Action for U.S. Appl. No. 14/838,259 dated Jun. 9, 2015, 37 pages.

Final Office Action for U.S. Appl. No. 14/906,162 dated Jun. 10, 2015, 10 pages.

(56) References Cited

OTHER PUBLICATIONS

Non-Final Office Action for U.S. Appl. No. 14/037,153 dated Jun. 19, 2015, 23 pages.
Final Office Action for U.S. Appl. No. 13/829,958 dated Jun. 19, 2015, 17 pages.
Final Office Action for U.S. Appl. No. 13/827,987 dated Jun. 19, 2015, 10 pages.
International Application No. PCT/US2014/039771, International Search Report and Written Opinion mailed on Apr. 29, 2015 6 pages.
International Application No. PCT/US2015/016346, International Search Report and Written Opinion mailed on May 4, 2015, 9 pages.
International Preliminary Report on Patentability dated Apr. 9, 2015 for PCT/US2013/062047, 10 pages.
International Preliminary Report on Patentability dated Apr. 9, 2015 for PCT/US2013/062052, 18 pages.
International Preliminary Report on Patentability dated May 28, 2015 for PCT/US2014/017061, 31 pages.
International Preliminary Report on Patentability dated Jun. 18, 2015 for PCT/US2013/073086, 7 pages.
Notice of Allowance for U.S. Appl. No. 12/548,187 dated Aug. 17, 2015, 18 pages.
Notice of Allowance for U.S. Appl. No. 13/107,742 dated Jul. 8, 2015, 9 pages.
Non-Final Office Actio for U.S. Appl. No. 14/037,072 dated Jul. 9, 2015, 12 pages.
Final Office Action for U.S. Appl. No. 13/830,502 dated Jun. 30, 2015, 25 pages.
Non-Final Office Action for U.S. Appl. No. 14/036,659 dated Aug. 13, 2015, 33 pages.
Non-Final Office Action for U.S. Appl. No. 13/830,759 dated Aug. 7, 2015, 23 pages.
International Preliminary Report on Patentability dated Jul. 29, 2015 for PCT/US2014/010920, 30 pages.
International Preliminary Report on Patentability dated Jul. 29, 2015 for PCT/US2014/039771, 24 pages.
Japan Patent Office office actions JPO patent application JP2013-529376 (Aug. 18, 2015).
Final Office Action for U.S. Appl. No. 13/177,748 dated Aug. 21, 2015, 24 pages.
Non-Final Office Action for U.S. Appl. No. 14/036,500 dated Aug. 14, 2015, 26 pages.
Notice of Allowance for U.S. Appl. No. 13/830,129 dated Sep. 22, 2015, 9 pages.
Final Office Action for U.S. Appl. No. 13/770,961 dated Aug. 31, 2015, 28 pages.
Non-Final Office Action for U.S. Appl. No. 13/764,560 dated Oct. 6, 2015, 18 pages.
Non-Final Office Action for U.S. Appl. No. 14/621,098 dated Oct. 15, 2015, 21 pages.
Notice of Allowance for U.S. Appl. No. 14/692,674 dated Oct. 15, 2015, 10 pages.
Notice of Allowance for U.S. Appl. No. 14/037,171 dated Oct. 15, 2015, 14 pages.
U.S. Appl. No. 13/828,640, Final Office Action mailed on Jun. 17, 2015, 11 pages.
"Oracle Complex Event Processing Exalogic Performance Study" an Oracle White Paper, Sep. 2011, 16 pages.
"Data stream management system", Wikipedia, downloaded from en.wikipedia.org/wiki/Data_stream_management_system on Sep. 23, 2015, pp. 1-5.
Josifovsky, Vanja, et al., "Querying XML Streams", The VLDB Journal, vol. 14, © 2005, pp. 197-210.
Purvee, Edwin Ralph, "Optimizing SPARQLeR Using Short Circuit Evaluation of Filter Clauses", Master of Science Thesis, Univ. of Georgia, Athens, GA, © 2009, 66 pages.
Weidong, Yang, et al., "LeoXSS: An Efficient XML Stream System for Processing Complex XPaths", CIT 2006, Seoul, Korea, © 2006, 6 pages.
Non-Final Office Action for U.S. Appl. No. 14/079,538 dated Oct. 22, 2015, 34 pages.
Non-Final Office Action for U.S. Appl. No. 13/906,162 dated Oct. 28, 2015, 11 pages.
Notice of Allowance for U.S. Appl. No. 14/302,031 dated Nov. 3, 2015, 18 pages.
Final Office Action for U.S. Appl. No. 12/949,081 dated Nov. 17, 2015, 19 pages.
China Patent Office office actions for patent application CN201180053021.4 (Oct. 28, 2015).
Notice of Allowance for U.S. Appl. No. 12/913,636 dated Oct. 27, 2015, 22 pages.
Final Office Action for U.S. Appl. No. 13/830,378 dated Nov. 5, 2015, 28 pages.
Non-Final Office Action for U.S. Appl. No. 13/830,502 dated Dec. 11, 2015, 25 pages.
Non-Final Office Action for U.S. Appl. No. 11/601,415 dated Nov. 13, 2015, 18 pages.
China Patent Office office actions for patent application CN201280022008.7 (Dec. 3, 2015).
European Application No. 12783063.6, Office Action mailed on Nov. 11, 2015, 8 pages.
Notice of Allowance for U.S. Appl. No. 12/548,187, dated Feb. 2, 2016, 15 pages.
Notice of Allowance for U.S. Appl. No. 14/037,072 dated Feb. 16, 2016, 17 pages.
Final Office Action for U.S. Appl. No. 13/830,735 dated Dec. 21, 2015, 20 pages.
Notice of Allowance for U.S. Appl. No. 13/827,987 dated Jan. 4, 2016, 16 pages.
Notice of Allowance for U.S. Appl. No. 13/177,748 dated Jan. 6, 2016, 9 pages.
Notice of Allowance for U.S. Appl. No. 13/828,640 dated Jan. 6, 2016, 16 pages.
Non-Final Office Action for U.S. Appl. No. 13/830,428 dated Jan. 15, 2016, 25 pages.
Final Office Action for U.S. Appl. No. 14/037,153 dated Jan. 21, 2016, 31 pages.
Non-Final Office Action for U.S. Appl. No. 13/829,958 dated Feb. 1, 2016, 20 pages.
Non-Final Office Action for U.S. Appl. No. 13/827,631 dated Feb. 11, 2016, 12 pages.
Ghazal et al., Dynamic plan generation for parameterized queries, Jul. 2009, 7 pages.
Chaudhuri et al., Variance aware optimization of parameterized queries, Jun. 2010, 12 pages.
Seshadri et al., SmartCQL: Semantics to Handle Complex Queries over Data Streams, 2010, 5 pages.
International Search Report and Written Opinion dated Dec. 15, 2015 for PCT/US2015/051268, 17 Pages.
"11 Oracle Event Processing NoSQL 1-20 Database Data Cartridge—11g Release 1 (11.1.1.7) 11," Oracle Fusion Middleware CQL Language Reference for Oracle Event Processing 11g Release 1 (11.1.1.7), 4 pages (Sep. 25, 2013).
Oracle Event Processing Hadoop Data Cartridge—11g Release 1(11.1.1.7), Oracle Fusion Middleware CQL LanguageReference for Oracle Event Processing 11g Release 1 (11.1.1.7) 4 pages (Sep. 25, 2013).
Liu "Hbase Con 2014: HBase Design Patterns @Yahoo!" (May 5, 2014), 20 pages.
Hasan et al. "Towards unified and native enrichment in event processing systems," Proceedings of the 7th ACM international conference on Distributed event-based systems, pp. 171-182 (Jun. 29, 2013).
Katsov "In-Stream Big Data Processing : Highly Scalable Blog" 20 pages (Aug. 20, 2013).
Katsov "In-Stream Big Data Processing : Highly Scalable Blog" 19 pages (Aug. 29, 2014).
Bestehorn Fault-tolerant query processing in structured P2P-systems, Springer Science+Business Media LLC Distrib Parallel Databases 28:33-66 (May 8, 2010).

(56) References Cited

OTHER PUBLICATIONS

Cooperativesystems: "Combined WLAN and Inertial Indoor Pedestrian Positioning System" URL:https://www.youtube.com/watch?v=mEt88WaHZvU.
Frank et al "Development and Evaluation of a Combined WLAN & Inertial Indoor Pedestrian Positioning System" Proceedings of the 22$^{nd}$ International Technical Meeting of the Satellite Division of the Institute of Navigation (ION GNSS 2009). (Sep. 25, 2009) pp. 538-546.
Kramer "Semantics and Implementation of Continuous Sliding Window Queries over Data Streams" ACM Transactions on Database Systems, vol. 34, pp. 4:1 to 4:49 (Apr. 2009).
Final Office Action for U.S. Appl. No. 13/830,428 dated May 26, 2016, 26 pages.
Final Office Action for U.S. Appl. No. 11/601,415 dated May 17, 2016, 17 pages.
Final Office Action for U.S. Appl. No. 14/036,659 dated Apr. 22, 2016, 38 pages.
Non-Final Office Action for U.S. Appl. No. 14/883,815 dated May 10, 2016, 32 pages.
Notice of Allowance for U.S. Appl. No. 12/949,081 dated May 3, 2016, 6 pages.
Final Office Action for U.S. Appl. No. 13/829,958 dated Jun. 30, 2016, 19 pages.
Final Office Action for U.S. Appl. No. 13/830,502 dated Jul. 6, 2016, 28 pages.
International Preliminary Report on Patentabiilty dated Jun. 16, 2016 for PCT/US2014/068641, 7 pages.
International Application No. PCT/RU2015/000468, International Search Report and Written Opinion mailed on Apr. 25, 2016, 9 pages.
International Application No. PCT/US2015/016346, International Search Report and Written Opinion mailed on May 24, 2016, 5 pages.
China Patent Office office action for patent application CN201180053021.4 (May 27, 2016).
Map Reduce, Wikipedia, The Free Encyclopedia, 2016, 11 pages.
Pig (programming tool), Wikipedia, The Free Encyclopedia, 2016, 4 pages.
U.S. Appl. No. 13/764,560, Final Office Action mailed on Apr. 14, 2016, 20 pages.
U.S. Appl. No. 13/764,560, Notice of Allowance mailed on Sep. 30, 2016, 10 pages.
U.S. Appl. No. 13/770,961, Notice of Allowance mailed on Apr. 4, 2016, 8 pages.
U.S. Appl. No. 13/830,759, Final Office Action mailed on Feb. 18, 2016, 18 pages.
U.S. Appl. No. 13/838,259, Final Office Action mailed on Feb. 19, 2016, 47 pages.
U.S. Appl. No. 13/906,162, Notice of Allowance mailed on Apr. 5, 2016, 7 pages.
U.S. Appl. No. 14/036,500, Final Office Action mailed on Mar. 17, 2016, 35 pages.
U.S. Appl. No. 14/079,538, Final Office Action mailed on Jul. 27, 2016, 28 pages.
U.S. Appl. No. 14/621,098, Final Office Action mailed on Apr. 21, 2016, 16 pages.
U.S. Appl. No. 14/883,815, Notice of Allowance mailed on Aug. 30, 2016, 13 pages.
U.S. Appl. No. 13/827,631, Final Office Action mailed on Oct. 20, 2016, 12 pages.
Hirzel et al., SPL Stream Processing Language Report, IBM Research Report RC24897 (W0911-044), Nov. 5, 2009, 19 pages.
Japanese Application No. 2014-509315, Office Action mailed on Mar. 15, 2016, 5 pages.
Kitagawa et al., Sensing Network, Information Processing, Information Processing Society of Japan, vol. 51, No. 9, Sep. 15, 2010, pp. 1119-1126.
Kuwata et al., Stream Data Analysis Application for Customer Behavior with Complex Event Processing, IEEE Technical Report, The Institute of Electronics, Information and Communication Engineers, vol. 110, No. 107, Jun. 21, 2010, pp. 13-18.
Mahlke et al., Comparison of Full and Partial Predicated Execution Support for ILP Processors, ICSA '95, Santa Margherita Ligure, 1995, pp. 138-149.
Olston et al., Pig Latin, A Not-So-Foreign Language for Data Processing, 2008, 12 pages.
International Application No. PCT/US2015/016346, International Preliminary Report on Patentability mailed on Sep. 30, 2016, 6 pages.
International Application No. PCT/US2015/051268, Written Opinion mailed on Aug. 18, 2016, 7 pages.
Watanabe et al., Development of a Data Stream Integration System with a Multiple Query Optimizer, Journal articles of the 15th Data Engineering Workshop (DEWS2004), The Institute of Electronics, Information and Communication Engineers, Technical Committee on Data Engineering, Aug. 11, 2009, pp. 1-8.
Yang et al., Map-Reduce-Merge, Simplified Relational Data Processing on Large Clusters, 2007, 12 pages.
"Bottom-up parsing", Wikipedia, downloaded from: http://en.wikipedia.org/wiki/Bottom-up_parsing on Sep. 8, 2014, pp. 1-2.
"Branch Predication", Wikipedia, downloaded from: http://en.wikipedia.org/wiki/Branch_predication on Sep. 8, 2014, pp. 1-4.
"Caching Data with SqiDataSource Control"—Jul. 4, 2011, 3 pages.
"Call User Defined Functions from Pig," Amazon Elastic MapReduce Developer Guide (Mar. 2009) 2 pages.
"Pattern Recognition With Match_Recognize," Oracle™ Complex Event Processing CQL Language Reference, 11g Release 1 (11.1.1) E12048-01, May 2009, pp. 15-1 to 15-20.
"SCD—Slowing Changing Dimensions in a Data Warehouse"—Aug. 7, 2011, one page.
"SQL Subqueries"—Dec. 3, 2011, 2 pages.
"Strings in C," Swarthmore College, retreived from internet: http://web.cs.swarthmore.edu/~newhall/unixhelp/C_strings.html (Jun. 12, 207) 3 pages.
"Supply Chain Event Management: Real-Time Supply Chain Event Management," product information Manhattan Associates (copyright 2009-2012) one page.
Abadi et al., Aurora: a new model and architecture for data stream management, the VLDB Journal the International Journal on very large data bases, vol. 12, No. 2, Aug. 1, 2003, pp. 120-139.
Abadi et al., Yes Aurora: A Data Stream Management System, International Conference on Management of Data, Proceedings of the 2003 ACM SIGMOD International Conference on Management of Data, 2003, 4 pages.
Advisory Action for U.S. Appl. No. 12/548,187 dated Sep. 26, 2014, 6 pages.
Agrawal et al. "Efficient pattern matching over event streams," Proceedings of the 2008 ACM SIGMOD international conference on Management of data, pp. 147-160 (Jun. 2008).
Aho et al., Efficient String Matching: An Aid to Bibliographic Search, Communications of the ACM, vol. 18, No. 6, Association for Computing Machinery, Inc., Jun. 1975, pp. 333-340.
Arasu et al., An Abstract Semantics and Concrete Language for Continuous Queries over Streams and Relations, 9th International Workshop on Database programming languages, Sep. 2003, 12 pages.
Arasu et al., CQL: A language for Continuous Queries over Streams and Relations, Lecture Notes in Computer Science vol. 2921, 2004, pp. 1-19.
Arasu et al., STREAM: The Stanford Data Stream Management System, Department of Computer Science, Stanford University, 2004, p. 21.
Arasu et al., The CQL Continuous Query Language: Semantic Foundations and Query Execution, Stanford University, The VLDB Journal—The International Journal on Very Large Data Bases, vol. 15, No. 2, Springer-Verlag New York, Inc, Jun. 2006, pp. 1-32.
Avnur et al. , Eddies: Continuously Adaptive Query Processing, 2007, 4 pages.
Avnur et al., Eddies: Continuously Adaptive Query Processing, In Proceedings of the 2000 ACM SIGMOD International Conference on Data, Dallas TX, May 2000, 12 pages.

(56) References Cited

OTHER PUBLICATIONS

Babcock et al., Models and Issues in Data Streams, Proceedings of the 21st ACM SIGMOD-SIGACT-SIDART symposium on Principles database systems, 2002, 30 pages.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Babu et al., Continuous Queries over Data Streams, SIGMOD Record, vol. 30, No. 3, Sep. 2001, pp. 109-120.
Bai et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Balkesen et al. "Scalable Data Partitioning Techniques for Parallel Sliding Window Processing over Data Streams," 8th International Workshop on Data Management for Sensor Networks (Aug. 2011).
Bose et al., A Query Algebra for Fragmented XML Stream Data, 9th International Conference on Data Base Programming Languages (DBPL), Sep. 2003, 11 pages.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
Buza , Extension of CQL over Dynamic Databases, Journal of Universal Computer Science, vol. 12, No. 9, Sep. 28, 2006, pp. 1165-1176.
Cadonna et al., Efficient event pattern matching with match windows, Proceedings of the 18$^{th}$ ACM SIGKDD international conference on knowledge discovery and data mining (Aug. 2012), pp. 471-479.
Carpenter, User Defined Functions, Retrieved from: URL: http://www.sglteam.comitemprint.asp?ItemID=979, Oct. 12, 2000, 4 pages.
Chan et al., Efficient Filtering of XML documents with Xpath expressions, 2002, pp. 354-379.
Chandramouli et al. "High-Performance Dynamic Pattern Matching over Disordered Streams," Proceedings of the VLDB Endowment, vol. 3 Issue 1-2, pp. 220-231 (Sep. 2010).
Chandrasekaran et al., PSoup: a system for streaming queries over streaming data, The VLDB Journal, The International Journal on very large data bases, vol. 12, No. 2, Aug. 1, 2003, pp. 140-156.
Chandrasekaran et al., TelegraphCQ: Continuous Dataflow Processing for an UncertainWorld, Proceedings of CIDR, 2003, 12 pages.
Chapple "Combining Query Results with the UNION Command," ask.com Computing Databases, downloaded from: http://databases.about.com/od/sql/a/union.htm (no date, printed on Oct. 14, 2013).
Chen et al., NiagaraCQ: A Scalable Continuous Query System for Internet Databases, Proceedings of the 2000 SIGMOD International Conference on Management of Data, May 2000, pp. 379-390.
Colyer et al. , Spring Dynamic Modules Reference Guide, Copyright, ver. 1.0.3, 2006-2008, 73 pages.
Colyer et al. , Spring Dynamic Modules Reference Guide, Ver. 1.1.3, 2006-2008, 96 pages.
Complex Event Processing in the Real World, An Oracle White Paper, Sep. 2007, 13 pages.
Conway, An Introduction to Data Stream Query Processing, Truviso, Inc., May 24, 2007, 71 pages.
Coral8 Complex Event Processing Technology Overview, Coral8, Inc., Make it Continuous, Copyright 2007 Coral8, Inc., 2007, pp. 1-8.
Creating WebLogic Domains Using the Configuration Wizard, BEA Products, Version 10.0, Dec. 2007, 78 pages.
Creating Weblogic Event Server Applications, BEA WebLogic Event Server, Version. 2.0, Jul. 2007, 90 pages.
Demers et al., Towards Expressive Publish/Subscribe Systems, Proceedings of the 10th International Conference on Extending Database Technology (EDBT 2006), Munich, Germany, Mar. 2006, pp. 1-18.

Demichiel et al., JSR 220: Enterprise JavaBeans™, EJB 3.0 Simplified API, EJB 3.0 Expert Group, Sun Microsystems, Ver. 3.0, May 2, 2006, 59 pages.
Dependency Injection, Dec. 30, 2008, pp. 1-7.
Deploying Applications to WebLogic Server, Mar. 30, 2007, 164 pages.
Deshpande et al., Adaptive Query Processing, Slide show believed to be prior to Oct. 17, 2007, 27 pages.
Developing Applications with Weblogic Server, Mar. 30, 2007, 254 pages.
DEWSON Beginning SQL Server 2008 for Developers: From Novice to Professional, A Press, Berkeley, CA, © 2008, pp. 418-438.
Diad et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar et al., Event Processing Support for Cross-Reality Environments, Pervasive Computing, IEEE CS, Jul.-Sep. 2009, Copyright 2009, IEEE, Jul.-Sep. 2009, pp. 2-9.
EPL Reference, Jul. 2007, 82 pages.
Esper Reference Documentation Version 3.1.0, EsperTech, retrieved from internet at URL: http://esper.codehaus.org/esper-3.1.0/doc/reference/en/pdf/esper_reference.pdf, 2009, 293 pages.
Esper Reference Documentation, Copyright 2007, Ver. 1.12.0, 2007, 158 pages.
Esper Reference Documentation, Copyright 2008, ver. 2.0.0, 2008, 202 pages.
Fantozzi "A Strategic Approach to Supply Chain Event Management," student submission for Masters Degree, Massachusetts Institute of Technology (Jun. 2003) 36 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01/wls/docs100/quickstart/quick_start. html, May 10, 2010, 1 page.
Fernandez et al., Build your own XQuery processor, slide show, at URL: http://www.galaxquery.org/slides/edbt-summer-school2004.pdf, 2004, 116 pages.
Fernandez et al., Implementing XQuery 1.0: The Galax Experience, Proceedings of the 29th VLDB Conference, Berlin, Germany, 2003, 4 pages.
Final Office Action for U.S. Appl. No. 12/396,464 dated May 16, 2014, 15 pages.
Final Office Action for U.S. Appl. No. 12/548,187 dated Jun. 4, 2014, 63 pages.
Final Office Action for U.S. Appl. No. 12/548,281 dated Aug. 13, 2014, 19 pages.
Final Office Action for U.S. Appl. No. 13/089,556 dated Jun. 13, 2014, 13 pages.
Florescu et al., The BEA/XQRL Streaming XQuery Processor, Proceedings of the 29th VLDB Conference, 2003, 12 pages.
Getting Started with WebLogic Event Server, BEA WebLogic Event Server version 2.0, Jul. 2007, 66 pages.
Gilani, Design and implementation of stream operators, query instantiator and stream buffer manager, Dec. 2003, 137 pages.
Golab et al., Issues in Data Stream Management, ACM SIGMOD Record, vol. 32, issue 2, ACM Press, Jun. 2003, pp. 5-14.
Golab et al., Sliding Window Query Processing Over Data Streams, Aug. 2006, 182 pages.
Gosling et al. , The Java Language Specification, 1996-2005, 684 pages.
Hao et al., Achieving high performance web applications by service and database replications at edge servers, Performance Computing and communications conference(IPCCC) IEEE 28th International, IEEE, Piscataway, NJ, USA, 2009, pp. 153-160.
Harish et al., "Identifying Robust Plans through Plan Diagram Reduction", PVLDB '08, Auckland, New Zealand, Aug. 23-28, 2008, pp. 1124-1140.
High Availability Guide, Oracle Application Server, 10g Release 3 (10.1.3.2.0), B32201-01, Jan. 2007, 314 pages.

(56) References Cited

OTHER PUBLICATIONS

Hopcroft, Introduction to Automata Theory, Languages, and Computation, Second Edition, Addison-Wesley, Copyright 2001, 524 pages.
Hulten et al., Mining Time-Changing Data Stream, Proceedings of the Seventh ACM SIGKDD International Conference on Knowledge Discovery and Data Mining., Aug. 2001, 10 pages.
Installing Weblogic Real Time, BEA WebLogic Real Time, Ver. 2.0, Jul. 2007, 64 pages.
International Application No. PCT/US2011/052019, International Search Report and Written Opinion mailed on Nov. 17, 2011, 55 pages.
International Application No. PCT/US2012/034970, International Search Report and Written Opinion mailed on Jul. 16, 2012, 13 pages.
International Application No. PCT/US2012/036353, International Search Report and Written Opinion mailed on Sep. 12, 2012, 11 pages.
International Search Report and Written Opinion dated Dec. 15, 2014 for PCT/US2014/010920, 10 pages.
International Search Report and Written Opinion dated Jul. 16, 2014 for PCT/US2013/062047.
International Search Report and Written Opinion dated Jul. 2, 2014 for PCT/US2013/062050.
International Search Report and Written Opinion dated Jul. 3, 2014 for PCT/US2013/062052.
International Search Report and Written Opinion dated Mar. 14, 2014 for PCT/US2013/073086.
International Search Report and Written Opinion dated Sep. 12, 2014 for PCT/US2014/017061.
Introduction to BEA WebLogic Server and BEA WebLogic Express, BEA WebLogic Server, Ver. 10.0, Mar. 2007, 34 pages.
Introduction to WebLogic Real Time, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Jin et al., ARGUS: Efficient Scalable Continuous Query Optimization for Large-Volume Data Streams, 10th International Database Engineering and Applications Symposium (IDEAS'06), 2006, 7 pages.
Kawaguchi et al., Java Architecture for XML Binding (JAXB) 2.2, Sun Microsystems, Inc., Dec. 10, 1999, 384 pages.
Knuth et al., Fast Pattern Matching in Strings, Siam J Comput. vol. 6(2), Jun. 1977, pp. 323-350.
Komazec et al. "Towards Efficient Schema-Enhanced Pattern Matching over RDF Data Streams," Proceedings of the 1st International Workshop on Ordering and Reasoning (OrdRing 2011), Bonn, Germany, (Oct. 2011).
Krämer, Continuous Queries Over Data Streams—Semantics and Implementation, Fachbereich Mathematik und Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
Lakshmanan et al., On efficient matching of streaming XML documents and queries, 2002, 18 pages.
Lindholm et al., Java Virtual Machine Specification, 2nd Edition Prentice Hall, Apr. 1999, 484 pages.
Liu et al., Efficient XSLT Processing in Relational Database System, Proceeding of the 32nd. International Conference on Very Large Data Bases (VLDB), Sep. 2006, pp. 1106-1116.
Luckham, What's the Difference Between ESP and CEP?, Complex Event Processing, downloaded, at URL:http://complexevents.com/?p=103, Apr. 29, 2011, 5 pages.
Madden et al., Continuously Adaptive Continuous Queries (CACQ) over Streams, SIGMOD 2002, Jun. 4-6, 2002, 12 pages.
Managing Server Startup and Shutdown, BEA WebLogic Server, ver. 10.0, Mar. 30, 2007, 134 pages.
Martin et al., Finding Application Errors and Security Flaws Using PQL, a Program Query Language, OOPSLA'05, Oct. 16, 2005, pp. 1-19.
Matching Behavior, .NET Framework Developer's Guide, Microsoft Corporation, Retrieved on: Jul. 1, 2008, URL: http://msdn.microsoft.com/en-us/library/Oyzc2ybO(printer).aspx, 2008, pp. 1-2.
Microsoft Computer Dictionary, 5th Edition, Microsoft Press, Redmond, WA, @ 2002, pp. 238-239 and 529.
Motwani et al., Query Processing Resource Management, and Approximation in a Data Stream Management System, Jan. 2003, 12 pages.
Munagala et al., Optimization of Continuous Queries with Shared Expensive Filters, Proceedings of the 26th ACM SIGMOD-SIGACT-SIGART symposium on Principles of database systems, Oct. 17, 2007, 14 pages.
Nah et al., A Cluster-Based TMO-Structured Scalable Approach for Location Information Systems, Object-Oriented Real-Time Dependable Systems, 2003. WORDS 2003 Fall. Proceedings. Ninth IEEE International Workshop on Date of Conference: Oct. 1-3, 2003, pp. 225-233.
New Project Proposal for Row Pattern Recognition—Amendment to SQL with Application to Streaming Data Queries, H2-2008-027, H2 Teleconference Meeting, Jan. 9, 2008, pp. 1-6.
Nichols et al., A faster closure algorithm for pattern matching in partial-order event data, IEEE International Conference on Parallel and Distributed Systems (Dec. 2007), pp. 1-9.
Non-Final Office Action for U.S. Appl. No. 11/601,415 dated Dec. 11, 2013, 57 pages.
Non-Final Office Action for U.S. Appl. No. 12/396,464 dated Dec. 31, 2013, 15 pages.
Non-Final Office Action for U.S. Appl. No. 12/548,187 dated Feb. 6, 2014, 53 pages.
Non-Final Office Action for U.S. Appl. No. 12/548,281 dated Feb. 13, 2014, 19 pages.
Non-Final Office Action for U.S. Appl. No. 12/913,636 dated Jul. 24, 2014, 21 pages.
Non-Final Office Action for U.S. Appl. No. 12/949,081 dated Jan. 28, 2015, 20 pages.
Non-Final Office Action for U.S. Appl. No. 12/957,201 dated Jul. 30, 2014, 12 pages.
Non-Final Office Action for U.S. Appl. No. 13/089,556 dated Jan. 9, 2014, 13 pages.
Non-Final Office Action for U.S. Appl. No. 13/107,742 dated Jun. 19, 2014, 20 pages.
Non-Final Office Action for U.S. Appl. No. 13/107,742 dated Jan. 21, 2015, 23 pages.
Non-Final Office Action for U.S. Appl. No. 13/177,748 dated Feb. 3, 2015, 22 pages.
Non-Final Office Action for U.S. Appl. No. 13/764,560 dated Sep. 12, 2014, 23 pages.
Non-Final Office Action for U.S. Appl. No. 13/770,961 dated Jan. 4, 2015, 22 pages.
Non-Final Office Action for U.S. Appl. No. 13/770,969 dated Aug. 7, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 13/828,640 dated Dec. 2, 2014, 11 pages.
Non-Final Office Action for U.S. Appl. No. 13/829,958 dated Dec. 11, 2014, 15 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/838,259 dated Oct. 24, 2014, 21 pages.
Non-Final Office Action for U.S. Appl. No. 13/839,288 dated Dec. 4, 2014, 30 pages.
Non-Final Office Action for U.S. Appl. No. 13/906,162 dated Dec. 29, 2014, 10 pages.

(56) References Cited

OTHER PUBLICATIONS

Non-Final Office Action for U.S. Appl. No. 14/077,230 dated Dec. 4, 2014, 30 pages.
Non-Final Office Action for U.S. Appl. No. 14/302,031 dated Aug. 27, 2014, 19 pages.
Non-Final Office Action for U.S. Appl. No. 11/601,415 dated Oct. 6, 2014, 18 pages.
Notice of Allowance for U.S. Appl. No. 12/396,464 dated Sep. 3, 2014, 7 pages.
Notice of Allowance for U.S. Appl. No. 12/957,201 dated Jan. 21, 2015, 5 pages.
Notice of Allowance for U.S. Appl. No. 13/089,556 dated Oct. 6, 2014, 9 pages.
Notice of Allowance for U.S. Appl. No. 13/102,665 dated Nov. 24, 2014, 9 pages.
Notice of Allowance for U.S. Appl. No. 13/770,969 dated Jan. 22, 2015, 5 pages.
Novick, Creating a User Defined Aggregate with SQL Server 2005, URL: http://novicksoftware.com/Articles/sql-2005-product-user-defined-aggregate.html, 2005, 6 pages.
Ogrodnek "Custom UDFs and hive," Bizo development blog http://dev.bizo.com (Jun. 23, 3009) 2 pages.
Oracle Application Server 10g, Release 2 and 3, New Features Overview, An Oracle White Paper, Oracle., Oct. 2005, 48 pages.
Oracle Application Server, Administrator's Guide, 10g Release 3 (10.1.3.2.0), B32196-01, Oracle, Jan. 2007, 376 pages.
Oracle Application Server, Enterprise Deployment Guide, lOg Release 3 (10.1.3.2.0), B32125-02, Oracle, Apr. 2007, 120 pages.
Oracle CEP Getting Started, Release 11 gR1 (11.1.1) E14476-01, May 2009, 172 pages.
Oracle Complex Event Processing CQL Language Reference, 11g Release 1 (11.1.1) E12048-03, Apr. 2010, 540 pages.
Oracle Database Data Cartridge Developer's Guide, B28425-03, 11 g Release 1 (11.1), Oracle, Mar. 2008, 372 pages.
Oracle Database, SQL Language Reference 11 g Release 1 (11.1), B28286-02, Oracle, Sep. 2007, 1496 pages.
Oracle Database, SQL Reference, 10g Release 1 (10.1), Part No. B10759-01, Dec. 2003, 7-1 to 7-17; 7-287 to 7-290; 14-61 to 14-74.
Oracle™ Complex Event Processing CQL Language Reference, 11g Release 1 (11.1.1.4.0) E12048-04,(Jan. 2011), pp. title page, iii-xxxviii, 1-1 to 4-26, 6-1 to 6-12, 18-1 to 20-26, Index-1 to Index-14.
Oracle™ Fusion Middleware CQL Language Reference, 11g Release 1 (11.1.1.6.3) E12048-10, (Aug. 2012) pp. title page, iii-xxxvi, 1-1 to 4-26, 6-1 to 6-12, 18-1 to 20-26, Index-1 to Index-14.
OSGI Service Platform Core Specification, The OSGI Alliance, OSGI Alliance, Apr. 2007, 288 pages.
PCT Patent Application No. PCT/US2014/010832, International Search Report mailed on Apr. 3, 2014, 9 pages.
Peng et al., Xpath Queries on Streaming Data, 2003, pp. 1-12.
Peterson, Petri Net Theory and the Modeling of Systems, Prentice Hall, 1981, 301 pages.
Postgressql, Documentation: Manuals: PostgresSQL 8.2: User-Defined Aggregates believed to be prior to Apr. 21, 2007, 4 pages.
Pradhan "Implementing and Configuring SAP® Event Management" Galileo Press, pp. 17-21 (copyright 2010).
Rao et al., "Compiled Query Execution Engine using JVM", ICDE '06, Atlanta, GA, Apr. 3-7, 2006, 12 pages.
Ray et al., Optimizing complex sequence pattern extraction using caching, data engineering workshops (ICDEW) 2011 IEEE 27th international conference on IEEE, Apr. 11, 2011, pp. 243-248.
Release Notes, BEA WebLogic Event Server, Ver. 2.0, Jul. 2007, 8 pages.
Sadri et al., Expressing and Optimizing Sequence Queries in Database Systems, ACM Transactions on Database Systems, vol. 29, No. 2, ACM Press, Copyright 2004, Jun. 2004, pp. 282-318.
Sadtler et al., WebSphere Application Server Installation Problem Determination, Copyright 2007, IBM Corp., 2007, pp. 1-48.
Sansoterra, Empower SQL with Java User-Defined Functions, ITJungle.com. , Oct. 9, 2003, 9 pages.
Shah et al., Flux: an adaptive partitioning operator for continuous query systems, Proceedings of the 19th International Conference on Data Engineering, Mar. 5-8, 2003, pp. 25-36.
Sharaf et al., Efficient Scheduling of Heterogeneous Continuous Queries, VLDB '06, Sep. 12-15, 2006, pp. 511-522.
Spring Dynamic Modules for OSGi Service Platforms product documentation, Jan. 2008, 71 pages.
SQL Tutorial-In, Tizag.com, http://web.archive.org/web/20090216215219/http://www.tizag.com/sqiTutorial/sqlin.php Feb. 16, 2009, pp. 1-3.
Stillger et al., "LEO-DB2's LEarning Optimizer", Proc. of the VLDB, Roma, Italy, Sep. 2001, pp. 19-28.
Stolze et al., User-defined Aggregate Functions in DB2 Universal Database, Retrieved from: <http://www.128. ibm.com/deve10perworks/db2/library/tachartic1e/0309stolze/0309stolze. html>, Sep. 11, 2003, 11 pages.
Stream Base New and Noteworthy, Stream Base, Jan. 12, 2010, 878 pages.
Stream Query Repository: Online Auctions, at URL: http://www-db.stanford.edu/stream/sqr/onauc.html#queryspecsend, Dec. 2, 2002, 2 pages.
Stream: The Stanford Stream Data Manager, Retrieved from: URL: http://infolab.stanford.edu/stream/, Jan. 5, 2006, pp. 1-9.
Stump et al., Proceedings, The 2006 Federated Logic Conference, IJCAR '06 Workshop, PLPV '06: Programming Languages meets Program Verification., 2006, pp. 1-113.
Terry et al., Continuous queries over append-only database, Proceedings of ACM SIGMOD, 1992, pp. 321-330.
The Stanford Stream Data Manager, IEEE Data Engineering Bulletin, Mar. 2003, pp. 1-8.
Tho et al. "Zero-latency data warehousing for heterogeneous data sources and continuous data streams," 5th International Conference on Information Integrationand Web-based Applications Services (Sep. 2003) 12 pages.
U.S. Appl. No. 10/948,523, Final Office Action mailed on Jul. 6, 2007, 37 pages.
U.S. Appl. No. 10/948,523, Non-Final Office Action mailed on Dec. 11, 2007, 48 pages.
U.S. Appl. No. 10/948,523, Notice of Allowance mailed on Dec. 1, 2008, 17 pages.
U.S. Appl. No. 10/948,523, Notice of Allowance mailed on Jul. 8, 2008, 28 pages.
U.S. Appl. No. 10/948,523, Office Action mailed on Jan. 22, 2007, 32 pages.
U.S. Appl. No. 10/948,523, Supplemental Notice of Allowance mailed on Jul. 17, 2008, 4 pages.
U.S. Appl. No. 10/948,523, Supplemental Notice of Allowance mailed on Aug. 25, 2008, 3 pages.
U.S. Appl. No. 11/601,415, Final Office Action mailed on May 27, 2009, 26 pages.
U.S. Appl. No. 11/601,415, Final Office Action mailed on Jul. 2, 2012, 58 pages.
U.S. Appl. No. 11/601,415, Final Office Action mailed on Jun. 30, 2010, 45 pages.
U.S. Appl. No. 11/601,415, Non-Final Office Action mailed on Sep. 17, 2008, 10 pages.
U.S. Appl. No. 11/601,415, Non-Final Office Action mailed on Nov. 30, 2009, 32 pages.
U.S. Appl. No. 11/601,415, Office Action mailed on Dec. 9, 2011, 44 pages.
U.S. Appl. No. 11/873,407, Final Office Action mailed on Apr. 26, 2010, 11 pages.
U.S. Appl. No. 11/873,407, Non-Final Office Action mailed on Nov. 13, 2009, 7 pages.
U.S. Appl. No. 11/873,407, Notice of Allowance mailed on Nov. 10, 2010, 14 pages.
U.S. Appl. No. 11/873,407, Notice of Allowance mailed on Mar. 7, 2011, 8 pages.
U.S. Appl. No. 11/874,197, Final Office Action mailed on Aug. 12, 2011, 21 pages.

(56) References Cited

OTHER PUBLICATIONS

U.S. Appl. No. 11/874,197, Final Office Action mailed on Jun. 29, 2010, 17 pages.
U.S. Appl. No. 11/874,197, Non-Final Office Action mailed on Dec. 22, 2010, 22 pages.
U.S. Appl. No. 11/874,197, Notice of Allowance mailed on Jun. 22, 2012, 20 pages.
U.S. Appl. No. 11/874,197, Office Action mailed on Nov. 10, 2009, 14 pages.
U.S. Appl. No. 11/874,202, Final Office Action mailed on Jun. 8, 2010, 18 pages.
U.S. Appl. No. 11/874,202, Non-Final Office Action mailed on Dec. 3, 2009, 15 pages.
U.S. Appl. No. 11/874,202, Notice of Allowance mailed on Mar. 31, 2011, 9 pages.
U.S. Appl. No. 11/874,202, Notice of Allowance mailed on Dec. 22, 2010, 13 pages.
U.S. Appl. No. 11/874,850, Notice of Allowance mailed on Jan. 27, 2010, 11 pages.
U.S. Appl. No. 11/874,850, Notice of Allowance mailed on Nov. 24, 2009, 12 pages.
U.S. Appl. No. 11/874,850, Notice of Allowance mailed on Dec. 11, 2009, 5 pages.
U.S. Appl. No. 11/874,896, Final Office Action mailed on Jul. 23, 2010, 28 pages.
U.S. Appl. No. 11/874,896, Non-Final Office Action mailed on Dec. 8, 2009, 15 pages.
U.S. Appl. No. 11/874,896, Non-Final Office Action mailed on Nov. 22, 2010, 25 pages.
U.S. Appl. No. 11/874,896, Notice of Allowance mailed on Jun. 23, 2011, 5 pages.
U.S. Appl. No. 11/927,681, Non-Final Office Action mailed on Mar. 24, 2011, 14 pages.
U.S. Appl. No. 11/927,681, Notice of Allowance mailed on Jul. 1, 2011, 8 pages.
U.S. Appl. No. 11/927,683, Final Office Action mailed on Sep. 1, 2011, 18 pages.
U.S. Appl. No. 11/927,683, Non-Final Office Action mailed on Mar. 24, 2011, 10 pages.
U.S. Appl. No. 11/927,683, Notice of Allowance mailed on Nov. 9, 2011, 7 pages.
U.S. Appl. No. 11/977,437, Final Office Action mailed on Apr. 8, 2010, 18 pages.
U.S. Appl. No. 11/977,437, Non-Final Office Action mailed on Oct. 13, 2009, 9 pages.
U.S. Appl. No. 11/977,437, Notice of Allowance mailed on Jul. 10, 2013, 10 pages.
U.S. Appl. No. 11/977,437, Notice of Allowance mailed on Mar. 4, 2013, 9 pages.
U.S. Appl. No. 11/977,437, Office Action mailed on Aug. 3, 2012, 16 pages.
U.S. Appl. No. 11/977,439, Non-Final Office Action mailed on Apr. 13, 2010, 7 pages.
U.S. Appl. No. 11/977,439, Notice of Allowance mailed on Mar. 16, 2011, 10 pages.
U.S. Appl. No. 11/977,439, Notice of Allowance mailed on Aug. 18, 2010, 11 pages.
U.S. Appl. No. 11/977,439, Notice of Allowance mailed on Sep. 28, 2010, 6 pages.
U.S. Appl. No. 11/977,439, Notice of Allowance mailed on Nov. 24, 2010, 8 pages.
U.S. Appl. No. 11/977,440, Notice of Allowance mailed on Oct. 7, 2009, 6 pages.
U.S. Appl. No. 12/395,871, Non-Final Office Action mailed on May 27, 2011, 7 pages.
U.S. Appl. No. 12/395,871, Notice of Allowance mailed on May 4, 2012, 5 pages.
U.S. Appl. No. 12/395,871, Office Action mailed on Oct. 19, 2011, 8 pages.
U.S. Appl. No. 12/396,008, Non-Final Office Action mailed on Jun. 8, 2011, 9 pages.
U.S. Appl. No. 12/396,008, Notice of Allowance mailed on Nov. 16, 2011, 5 pages.
U.S. Appl. No. 12/396,464, Final Office Action mailed on Jan. 16, 2013, 16 pages.
U.S. Appl. No. 12/396,464, Non-Final Office Action mailed on Sep. 7, 2012, 17 pages.
U.S. Appl. No. 12/506,891, Notice of Allowance mailed on Jul. 25, 2012, 8 pages.
U.S. Appl. No. 12/506,891, Office Action mailed on Dec. 14, 2011, 17 pages.
U.S. Appl. No. 12/506,905, Notice of Allowance mailed on Dec. 14, 2012, 8 pages.
U.S. Appl. No. 12/506,905, Office Action mailed on Aug. 9, 2012, 33 pages.
U.S. Appl. No. 12/506,905, Office Action mailed on Mar. 26, 2012, 60 pages.
U.S. Appl. No. 12/534,384, Notice of Allowance mailed on May 7, 2013, 11 pages.
U.S. Appl. No. 12/534,384, Office Action mailed on Feb. 28, 2012, 12 pages.
U.S. Appl. No. 12/534,384, Office Action mailed on Feb. 12, 2013, 13 pages.
U.S. Appl. No. 12/534,398, Final Office Action mailed on Jun. 5, 2012, 16 pages.
U.S. Appl. No. 12/534,398, Notice of Allowance mailed on Nov. 27, 2012, 9 pages.
U.S. Appl. No. 12/534,398, Office Action mailed on Nov. 1, 2011, 14 pages.
U.S. Appl. No. 12/548,187, Final Office Action mailed on Jun. 10, 2013, 17 pages.
U.S. Appl. No. 12/548,187, Non Final Office Action mailed on Sep. 27, 2011, 17 pages.
U.S. Appl. No. 12/548,187, Non-Final Office Action mailed on Apr. 9, 2013, 17 pages.
U.S. Appl. No. 12/548,187, Office Action mailed on Jun. 20, 2012, 31 pages.
U.S. Appl. No. 12/548,209, Notice of Allowance mailed on Oct. 24, 2012, 12 pages.
U.S. Appl. No. 12/548,209, Office Action mailed on Apr. 16, 2012, 16 pages.
U.S. Appl. No. 12/548,222, Non-Final Office Action mailed on Apr. 10, 2013, 16 pages.
U.S. Appl. No. 12/548,222, Non-Final Office Action mailed on Oct. 19, 2011, 17 pages.
U.S. Appl. No. 12/548,222, Notice of Allowance mailed on Jul. 18, 2013, 12 pages.
U.S. Appl. No. 12/548,222, Office Action mailed on Jun. 20, 2012, 20 pages.
U.S. Appl. No. 12/548,281, Final Office Action mailed on Oct. 10, 2013, 21 pages.
U.S. Appl. No. 12/548,281, Non-Final Office Action mailed on Apr. 12, 2013, 16 pages.
U.S. Appl. No. 12/548,281, Non-Final Office Action mailed on Oct. 3, 2011, 18 pages.
U.S. Appl. No. 12/548,281, Office Action mailed on Jun. 20, 2012, 29 pages.
U.S. Appl. No. 12/548,290, Final Office Action mailed on Jul. 30, 2012, 21 pages.
U.S. Appl. No. 12/548,290, Non-Final Office Action mailed on Oct. 3, 2011, 15 pages.
U.S. Appl. No. 12/548,290, Non-Final Office Action mailed on Apr. 15, 2013, 17 pages.
U.S. Appl. No. 12/548,290, Notice of Allowance mailed on Sep. 11, 2013, 6 pages.
U.S. Appl. No. 12/913,636, Final Office Action mailed on Jan. 8, 2013, 21 pages.
U.S. Appl. No. 12/913,636, Office Action mailed on Jun. 7, 2012.
U.S. Appl. No. 12/949,081, Final Office Action mailed on Aug. 27, 2013, 12 pages.
U.S. Appl. No. 12/949,081, Non-Final Office Action mailed on Jan. 9, 2013, 12 pages.

(56) References Cited

OTHER PUBLICATIONS

U.S. Appl. No. 12/957,194, Non-Final Office Action mailed on Dec. 7, 2012, 11 pages.
U.S. Appl. No. 12/957,194, Notice of Allowance mailed on Mar. 20, 2013, 9 pages.
U.S. Appl. No. 12/957,201, Final Office Action mailed on Apr. 25, 2013, 10 pages.
U.S. Appl. No. 12/957,201, Office Action mailed on Dec. 19, 2012, 13 pages.
U.S. Appl. No. 13/089,556, Final Office Action mailed on Aug. 29, 2013, 10 pages.
U.S. Appl. No. 13/089,556, Non-Final Office Action mailed on Apr. 10, 2013, 9 pages.
U.S. Appl. No. 13/089,556, Office Action mailed on Nov. 6, 2012, 12 pages.
U.S. Appl. No. 13/102,665, Final Office Action mailed on Jul. 9, 2013, 16 pages.
U.S. Appl. No. 13/102,665, Office Action mailed on Feb. 1, 2013, 13 pages.
U.S. Appl. No. 13/107,742, Final Office Action mailed on Jul. 3, 2013, 19 pages.
U.S. Appl. No. 13/107,742, Non-Final Office Action mailed on Feb. 14, 2013, 16 pages.
U.S. Appl. No. 13/177,748, Non-Final Office Action mailed on Aug. 30, 2013, 23 pages.
U.S. Appl. No. 13/184,528, Notice of Allowance mailed on Mar. 1, 2012, 16 pages.
U.S. Appl. No. 13/193,377, Notice of Allowance mailed on Aug. 30, 2013, 18 pages.
U.S. Appl. No. 13/193,377, Office Action mailed on Aug. 23, 2012, 20 pages.
U.S. Appl. No. 13/193,377, Office Action mailed on Jan. 17, 2013, 24 pages.
U.S. Appl. No. 13/244,272, Final Office Action mailed on Mar. 28, 2013, 29 pages.
U.S. Appl. No. 13/244,272, Notice of Allowance mailed on Aug. 12, 2013, 12 pages.
U.S. Appl. No. 13/244,272, Office Action mailed on Oct. 4, 2012, 29 pages.
U.S. Appl. No. 13/177,748, Final Office Action mailed on Mar. 20, 2014, 23 pages.
Ullman et al., Introduction to JDBC, Stanford University, 2005, 7 pages.
Understanding Domain Configuration, BEA WebLogic Server, Ver. 10.0, Mar. 30, 2007, 38 pages.
Vajjhala et al., The Java Architecture for XML Binding (JAXB) 2.0, Apr. 19, 2006, 384 pages.
Vijayalakshmi et al., Processing location dependent continuous queries in distributed mobile databases using mobile agents, IET-UK International Conference on Information and Communication Technology in Electrical Sciences (ICTES 2007), Dec. 22, 2007, pp. 1023-1030.
W3C, XML Path Language (Xpath), W3C Recommendation, Version. 1.0, Retrieved from: URL: http://www.w3.org/TR/xpath, Nov. 16, 1999, 37 pages.
Wang et al., Distributed continuous range query processing on moving objects, DEXA'06 Proceedings of the 17th international conference on Database and Expert Systems Applications, 2006, pp. 655-665.
WebLogic Event Server Administration and Configuration Guide, BEA WebLogic Event D Server, Version. 2.0, Jul. 2007, 108 pages.
WebSphere Application Server V6.1 Problem Determination: IBM Redpaper Collection, Dec. 2007, 634 pages.
What is BPM? Datasheet [online]. IBM, [retrieved on Jan. 28, 2013]. Retrieved from the Internet: <URL: http://www-01.ibm.com/software/info/bpm/whatis-bpm/>.
White et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.
Widom et al., CQL: A Language for Continuous Queries over Streams and Relations, Oct. 17, 2007, 62 pages.
Widom et al., The Stanford Data Stream Management System, PowerPoint Presentation, Oct. 17, 2007, 110 pages.
Wilson "SAP Event Management, an Overview," Q Data USA, Inc.( copyright 2009) 16 pages.
Wu et al., Dynamic Data Management for Location Based Services in Mobile Environments, Database Engineering and Applications Symposium, 2003, Jul. 16, 2003, pp. 172-181.
Zemke, XML Query, Mar. 14, 2004, 29 pages.
U.S. Appl. No. 13/829,958 Non-Final Office Action, mailed on Dec. 27, 2016, 20 pages.
U.S. Appl. No. 13/838,259 Non-Final Office Action, mailed on Jan. 4, 2017, 65 pages.
U.S. Appl. No. 14/621,098 Non-Final Office Action, mailed on Nov. 14, 2016, 17 pages.
U.S. Appl. No. 15/003,646 Non-Final Office Action, mailed on Dec. 2, 2016, 9 pages.
U.S. Appl. No. 14/559,550 Non-Final Office Action, mailed on Jan. 27, 2017, 16 pages.
U.S. Appl. No. 15/015,933 Non-Final Office Action, mailed on Jan. 30, 2017, 11 pages.
U.S. Appl. No. 13/830,759, Non-Final Office Action mailed on Feb. 10, 2017, 23 pages.
U.S. Appl. No. 13/827,631, Non-Final Office Action mailed on Feb. 16, 2017, 16 pages.
International Application No. PCT/US2015/051268 International Preliminary Report on Patentability mailed on Dec. 8, 2016, 12 pages.
China Patent Application No. CN201480030482.3, Office Action mailed on Feb. 4, 2017, 5 pages.
Sadana "Interactive Scatterplot for Tablets," The 12th International Working Conference on Advanced Visual Interfaces, available from https://vimeo.com/97798460 (May 2014).
U.S. Appl. No. 13/830,428, Non-Final Office Action mailed on Mar. 22, 2017, 25 pages.
U.S. Appl. No. 13/830,502, Non-Final Office Action mailed on Apr. 7, 2017, 28 pages.
U.S. Appl. No. 14/036,500, Non-Final Office Action mailed on Feb. 9, 2017, 34 pages.
U.S. Appl. No. 14/079,538, Non-Final Office Action mailed on Mar. 31, 2017, 24 pages.
U.S. Appl. No. 15/360,650, Non-Final Office Action mailed on Mar. 9, 2017, 34 pages.
U.S. Appl. No. 13/830,735, Non-Final Office Action mailed on Apr. 4, 2017, 16 pages.
U.S. Appl. No. 15/177,147, Non-Final Office Action mailed on Apr. 7, 2017, 12 pages.
U.S. Appl. No. 14/866,512, Non-Final Office Action mailed on Apr. 10, 2017, 24 pages.
U.S. Appl. No. 14/610,971, Notice of Allowance mailed on Apr. 12, 2017, 11 pages.

* cited by examiner

EMBEDDED EVENT PROCESSING

CROSS-REFERENCE TO RELATED APPLICATIONS

This application is a non-provisional of and claims the benefit and priority under 35 U.S.C. 119(e) of U.S. Provisional Application No. 62/017,736 filed Jun. 26, 2014 entitled "EMBEDDED EVENT PROCESSING," the entire contents of which is incorporated herein by reference for all purposes.

BACKGROUND

Event processing systems consist of a topological network of components forming what is known as an Event Processing Network (EPN) that together collaborate towards the processing of the events. In this EPN, the events originate at event sources, which typically reside in remote edge devices, or gateways. The event sources send their events to downstream processors, which reside in data centers and enterprise servers. The problem with this approach is that the events are only processed after they have been transported from the edge to the centralized servers, sometimes making unnecessary use of bandwidth and processing power. For example, in some cases the events are simply filtered out (discarded) by the processor in the server. In other cases, several events are aggregated into a single event in the server. To cope with this problem, systems typically try to scale by adding more bandwidth between the edge and the server and more processing power in the servers.

Event processing systems that include remote event sources, and perform the bulk of the processing on centralized systems (e.g. datacenter servers) often suffer from inefficiencies because all of the event data must be transported across the network before it can be centrally processed. This can result in longer latencies in responding to events, bandwidth problems from the large amount of event traffic (especially in the case of low bandwidth connections from the remote sources), and an inability to fully utilize computing capacity in remote/edge devices 104.

BRIEF DESCRIPTION OF THE DRAWINGS

The detailed description is set forth with reference to the accompanying figures. In the figures, the left-most digit(s) of a reference number identifies the FIG. in which the reference number first appears. The use of the same reference numbers in different FIGS. indicates similar or identical items.

BRIEF SUMMARY

Figure 1:
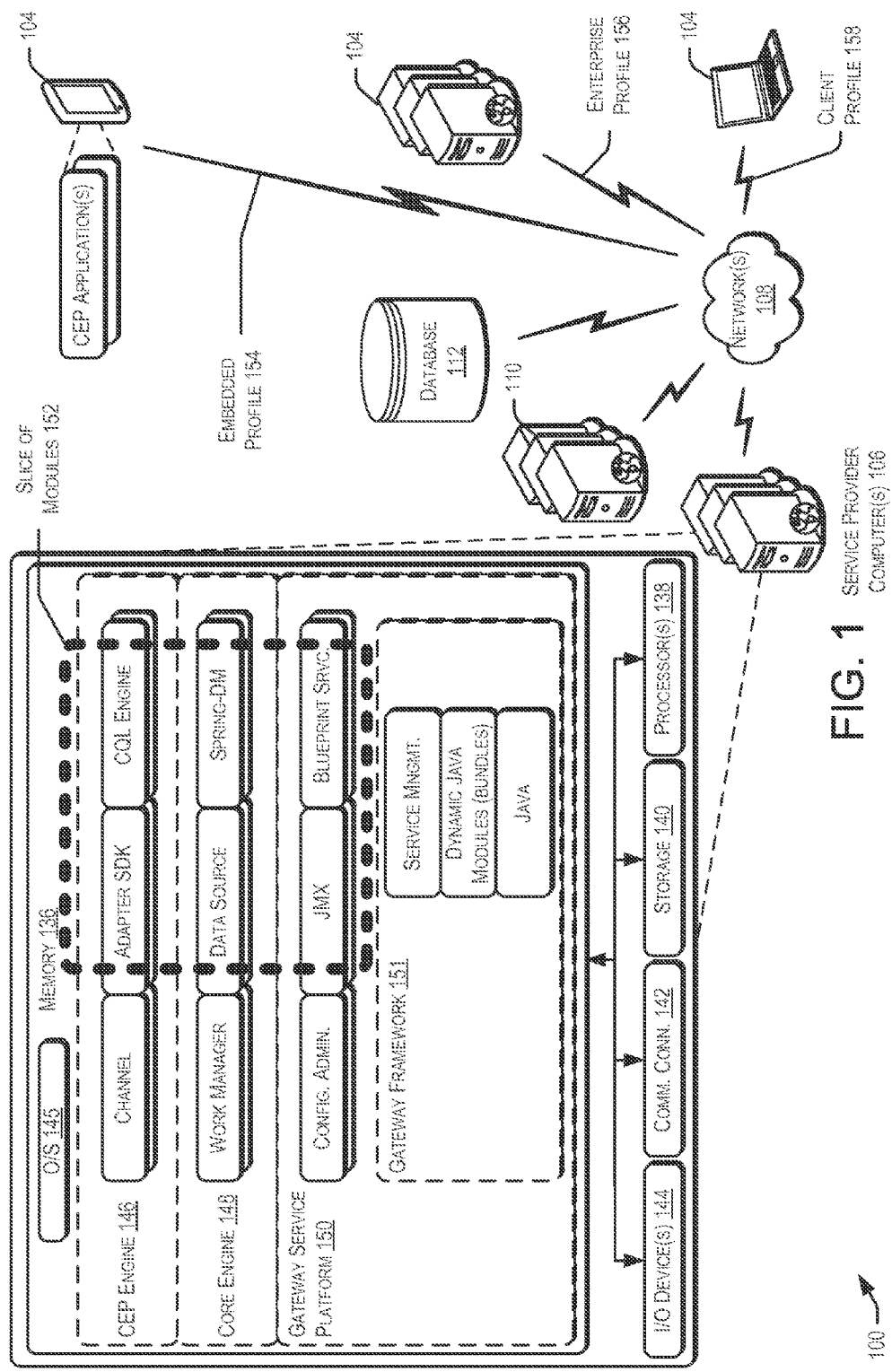
FIG. 1 is a simplified block diagram illustrating an example architecture for embedded event processing as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to one embodiment, a system may be configured with a memory and a processor. The processor may be configured to execute instructions stored on the memory to manage a plurality of different feature sets for implementing different versions of a complex event processing platform. The processor may also be configured to execute the instructions to receive capability information from a plurality of edge devices 104. In some aspects, the process may be configured to execute the instructions to determine a profile for each of the plurality of edge devices based at least in part on the capability information of each of the respective plurality of edge devices 104. The instructions may also be executed to generate at least a first version of the different versions of the complex event processing platform for at least a first determined profile and provide the first version of the complex event processing platform to a first device of the plurality of edge devices according to the determined profile of the first device. The instructions may also be executed to receive events from the first version of the complex event processing platform executed by the first device.

In some examples, the plurality of edge devices may comprise at least one of a handheld device, a desktop device, a laptop device, an embedded device, an enterprise device, or a client device. At least the first version and a second version of the different versions of the complex event processing platform may include different subsets of the plurality of different features sets. The first version of the complex event processing platform may be provided to the first device, by a device manager, as a set of instructions, the set of instructions may comprise a bundle order, and the bundle order may identify an implementation order and/or dependencies of the plurality of different feature sets included in the first version of the complex event processing platform provided to the first device. The first version of the complex event processing platform may enable the first device to implement complex event processing on the events prior to receipt of the events by the system.

According to another embodiment, a method may be executed by a processor of an edge computing device to at least receive instructions for executing at least a subset of complex event processing features. The processor of the edge computing device may also identify a stream of events received by the edge computing device. The processor may also process the events of the stream utilizing the subset of complex event processing features. The processor may also provide the processed events to a complex event platform of a server. In some examples, the instructions for executing the subset of the complex event processing features may be received from the server and the processing of the events of the stream may be performed based at least in part on local context information identified by the edge computing device. In some cases, the edge computing device may be a handheld device, a desktop device, a laptop device, an embedded device, an enterprise device, and/or a client device. The server may be configured to manage a plurality of different feature sets for implementing different versions of the complex event platform. Additionally, in some examples, the at least a subset of complex event processing features may correspond to at least one of the different feature sets. Further, the server may be configured to determine a profile for the edge computing device based at least in part on capability information of the edge computing device and the capability information may be provided to the server at least prior to receiving the instructions for executing the at least a subset of complex event processing features.

According to another embodiment, a computer-readable storage medium may be configured to store computer-executable instructions that, when executed by a computer system, cause the computer system to perform operations. In some examples, the operations may include receiving capability information from an edge computing device. The operations may also include determining a profile for the edge computing device based at least in part on the capability information and/or generating a version of a complex event processing platform with limited functionality for the determined profile. In some examples, the operations may also include providing the version of the complex event processing platform with limited functionality to the edge computing device for execution and/or enabling the edge computing device to execute the version of the complex event processing platform with limited functionality for processing events received at the edge computing device. In some cases, the operations may also include receiving processed events from the version of the complex event processing platform with limited functionality executed by the edge computing device. The version of the complex event processing platform with limited functionality may enable the edge computing device to implement complex event processing on the events prior to receipt of the events by the computer system. Further, the version of the complex event processing platform with limited functionality may be provided to the edge computing device as a bundle order of instructions and/or the bundle order may identify an implementation order and/or dependencies of the plurality of different feature sets included in the version of the complex event processing platform with limited functionality provided to the edge computing device.

The foregoing, together with other features and embodiments will become more apparent upon referring to the following specification, claims, and accompanying drawings.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing embedded event processing for edge devices 104. In some examples, these embedded event processing techniques/features may be provided within an event processing and/or business intelligence framework. For example, an event processing framework may be configured to process streaming data from one or more sources (e.g., third-party streaming sources or the like) at edge devices instead of initially at a complex event processing (CEP) server or other CEP service provider. As such, some CEP processing may be performed by the edge devices prior to sending the events to the CEP server for managing the data. In this way, not all events are to be sent to the CEP server, reducing bandwidth, processing, and/or other needs of the CEP server. CEP technology can allow data volumes to be dramatically reduced in the initial stages of processing through a variety of techniques including event aggregation, correlation, filtering, and pattern recognition. Applying this processing at or near the network edge reduces the volume of events that needs to be sent to central servers and increases the overall efficiency/performance of the system.

Techniques of the present discloser move the event processing functions (i.e. filter, aggregation, pattern match) from the centralized servers to the edge. This way, the processing of the event is done at the source of the event. This avoids the unnecessary use of resources downstream when the event is subject to be dropped or aggregated eventually. For example, if the event would have been filtered in the server, it may be better to filter it at the source, and thus avoid its transport from the edge to the server, freeing up resources to work on other events. In some examples, this may be done by hosting an embedded version of a CEP product directly in an edge component. To do so, the CEP product may be profiled for resource constrained environments. For example, it should be able to run in environments that do not have a lot of memory, nor disk, when compared to a typical data center server. To accomplish this, the physical size of the product may be decreased (e.g., by roughly two-thirds of its original size used for the enterprise cases).

In one non-limiting example, a server-side CEP platform (e.g., including a CEP engine) may be configured to divide up CEP processing features or other event stream processing features into feature sets. Each feature set may include one or more different event processing features that, when implemented together, may enable a computing system to perform at least a subset of the functionality of the server-side CEP platform. Additionally, each of these feature sets may be provided to one or more edge devices for remote implementation. In some cases, the feature set may be determined based at least in part on a profile of the edge device 104. The profile of each edge device may be determined based at least in part on the processing, memory, etc., capabilities of the edge devices 104. Thus, edge devices with more processing power, bandwidth, memory, etc., may be provided with more rich or full feature sets, enabling some higher profile edge devices to execute more stream processing than other edge devices 104.

In some examples, the service provider may be configured to support continuous query language (CQL) queries (also referred to as "query statements") on one or more data streams. Additionally, in some examples, mechanisms for supporting the CQL queries may also enable configuration of scripting code executed by the service providers (e.g., JavaScript or the like). This code may be configured, generated, managed, updated, and/or otherwise manipulated by a user, administrator, or other entity associated with the event data (e.g., business event data). As such, once implemented, the one or more edge devices may be configured to support CQL queries on one or more data streams. Once processed by the edge devices, the edge devices may provide output streams to the service provider event processors as input streams.

In general, a continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence of numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred. Additionally, attributes associated with each event may indicate particular (e.g., relevant) information (e.g., stored as meta-data) about the worldly event such as, but not limited to, a user and/or item associated with the worldly event (e.g., a purchaser ID, a seller ID, a product ID, a price of the item, a location of the user, etc.), weather at a location during the worldly event, or the like.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream may have an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and one or more attributes. For example, the stock ticker event stream may receive the following events and associated timestamps:

...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...

In the above stream, for stream element (<timestamp_N+1>, <ORCL,62>), the event is <ORCL,62> with attributes "stock_symbol" and "stock_value." The timestamp associated with the stream element is "timestamp_N+1." A continuous event stream is thus a flow of events, each event having a series (in some examples, the same series) of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Further, as used herein, a continuous query may generally be capable of processing data of (i.e., queried against) a stream.

In the following description, for the purposes of explanation, specific details are set forth in order to provide a thorough understanding of embodiments of the disclosure. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

FIG. 1 depicts a simplified example system or architecture 100 in which techniques for embedded event processing may be implemented. In architecture 100, one or more edge devices 104 (e.g., an embedded and/or handheld user device, an enterprise desktop device, or a client device) may access one or more service provider computers 106 via one or more networks 108. In some aspects, the service provider computers 106 may also be in communication with one or more streaming data source computers 110 and/or one or more databases 112 via the networks 108. In some examples, the edge devices 104 may interact with the service provider computers 106 by providing queries (also referred to as "query statements") or requests for data (e.g., historical event data, streaming event data, etc.). Such queries or requests may then be executed by the service provider computers 106 to process data of the databases 112 and/or incoming data from the streaming data source computers 110 (e.g., continuously querying incoming data as the incoming data is pushed to the query). Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the edge devices 104104 accessing the service provider computers 106 over the networks 108, the described techniques may equally apply in instances where the edge devices 104104 interact with one or more service provider computers 106 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The edge devices 104 may be any type of computing device such as, but not limited to, a mobile phone, a smart phone, a personal digital assistant (PDA), a laptop computer, a desktop computer, a thin-client device, a tablet PC, etc. In some examples, the edge devices 104 may be in communication with the service provider computers 106 via the networks 108, or via other network connections. The edge devices 104 may also be configured to provide one or more queries or query statements for requesting data of the databases 112 (or other data stores) to be processed or may be configured to have one or more CQL queries enabled to receive an input stream of events (or other data). The edge devices 104 may also be configured to provide code for configuring the service provider computers 106 to provide an embedded CEP platform or other subset of CEP platform functionality to the edge devices 104. For example, the service provider computers 106 may determine a profile for one of the edge devices 104, and provide an extensible hypertext markup language (XML) or the like to the edge devices 104 for implementing the limited features of the CEP platform (i.e., a feature set with limited functionality relative to a full-fledge CEP platform).

In some aspects, the service provider computers 106 may also be any type of computing devices such as, but not limited to, mobile, desktop, thin-client, and/or cloud computing devices, such as servers. In some examples, the service provider computers 106 may be in communication with the edge devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management custom partitions for event streams described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media (and may be non-transitory). For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 106 may also contain communications connection(s) 142 that allow the service provider computers 106 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 145 and one or more application programs or services for implementing the features disclosed herein including at least a CEP engine 146, a core engine 148, and/or a gateway service platform 150 (e.g., possibly including a gateway framework 151). In some examples, features or modules of the CEP platform may be sliced 152 or otherwise selected to form a feature set of embedded CEP platform functionality. As used herein, modules may refer to programming modules executed by servers or clusters of servers that are part of a service (e.g., a CEP platform). In this particular context, the modules may be executed by the servers or clusters of servers that are part of the service provider computers 106.

Additional types of computer storage media (which may also be non-transitory) that may be present in the service provider computers 106 and/or user devices 104 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 106 and/or user devices 104. Combinations of any of the above should also be included within the scope of computer-readable storage media.

An embedded profile 154 including features from a particular slice of modules 152 may be provided to an embedded edge device 104. An enterprise profile 156 including features (e.g., a different set of features from those in the embedded profile) may be provided to an enterprise edge device 104. Additionally, in some examples, a client profile 158 may be provided to a client edge device 104. Each of the profiles may have overlapping features, may include completely different sets of features, and/or may have the same slice of modules (i.e., the same features) 152. The gateway service platform 150 and/or the gateway framework 151 may be utilized to implement a modular system for supporting modules and bundle orders (for implementing the modules and/or for identifying dependencies of the modules). While a particular set of modules is shown in FIG. 1 as part of the slice of modules 152, any set of modules may be included in any slice of modules, and the particular set of FIG. 1 is merely an example.

In some examples, events may be filtered, aggregated, or otherwise processed and acted upon by the edge devices 104 themselves prior to the back-end CEP engine 146 receiving the input stream. This edge device event processing may be enterprise-grade and/or enterprise-quality. In other words, within the context of event processing, there may be several grades or levels of complexity. In some cases, the simplest level of event processing may be pass-through processing or message passing. The next level, in order of complexity, may include some types of routing and/or filtering of events. Complex processing (otherwise referred to as stream processing) may generally be considered the highest grade or level of event processing. This highest grade may also be considered enterprise-grade or heavy-duty. Thus, the features described herein allow users (or edge devices 104) to implement complex or stream processing on the edge.

Additionally, in some cases, the context (e.g., local contextual information) of the edge devices 104 may be useful in performing the embedded event processing on the edge devices 104. In some examples, such context may generally be lost by the time the events are received at the backend server, under a standard CEP implementation. Examples of context may include, how much battery is remaining on the edge device 104, what type of network traffic is the edge device 104 experiencing, what time of the day are the events being processed, etc. In some examples, this type of context information may be useful for processing the incoming stream. For example, if an edge device 104 determines that a threshold amount of battery power remains, the edge device 104 may decide to send fewer events out to the server to save battery. Thus, the edge device 104 may aggregate events from the stream, so that fewer events are passed to the backend server 106 by the edge device 104. Similarly, if the bandwidth of the edge device 104 is below a threshold, the edge device 104 may decide to postpone the transfer of the processed stream. Other smart decisions may be made at the edge device 104 based at least in part on other contextual information identified at the edge.

In some examples, different services may be selected for different environments. For example, the enterprise server (e.g., the backend) 106 may include the full set of services available for stream processing. However, some edge devices 104 may not be able to implement the full set of services. For example, some edge devices 104 may not be able to handle the memory footprint of the entire set of CEP features, while some edge devices may not be able to handle the processing requirements, or both. For example, some CEP functions are performed in a recursive manner. However, many embedded devices may not have enough in-memory (e.g., RAM or other volatile memory) storage to handle recursive methods. Thus, in some examples, the service provider (or backend server) 106 may slice and dice CEP features for providing to different edge devices 104. In some cases, one or more profiles may be generated that each have a different set of CEP features (or feature sets). The profiles may have the features of the feature set provided in a declarative fashion. That is, a declaration may be provided (e.g., in an XML document or other file) that identifies the features to be included in each profile. The XML document may act as a specification for how the edge device should be configured with the CEP features. Additionally, some additional information may be provided (or included in the XML document) to identify the order in which the features should be implemented (for started), one or more dependencies between the implemented features, etc. The edge device may receive this additional information from the backend server in many different ways. For example, a device manager may push such a configuration to the edge devices (e.g., dynamically). In some examples, new or different profiles (e.g., with different features or a different feature set) may be pushed out to different edge devices upon request, or as desired.

Particular profiles may be mapped to a feature set of features. In some examples, there may be many components for implementing the embedded CEP platform. The components may be organized into features, such that a single feature may be provided by more than or a combination of components. These components may be modularized, such that many of the underlying infrastructure that are generally part of the application server (e.g., the backend CEP platform) may be provided in the profiles for the embedded CEP platform. For example, threading, logging, etc., may be included on the edge, so the whole infrastructure may be modularized as opposed to just a few components. In some examples, there may be instances when the backend server may provide real-time instructions to the edge device to perform one or more CEP processes on incoming streams (e.g., streams received by the edge device). In this way, there may be some level of interaction between the backend server and the edge devices once the embedded CEP platforms are implemented on the edge devices (e.g., to control or otherwise instruct the edge devices). For example, if an edge device is filtering stream data, the backend server may identify a threshold of data that should be aggregated or otherwise not provided to the backend. One example of this would be a thermostat that provides temperature data. The backend may identify that it can configure the embedded CEP platform to provide an output stream as an input stream to the backend based at least in part on the data (e.g., based on the temperature). For example, the backend may not need temperature information every second, so it may instruct the edge device to process the temperature stream every second, but to only provide the data every minute, or, alternatively, it may instruct the edge device to only process the stream every minute. The platform may then be managed by the users of the edge devices 104.

In some examples, the edge devices may be enabled to utilize an embedded database inside the edge device 104. Additionally, a monitoring and a management API may be provided by the backend as part of the embedded CEP platform. In this way, the edge devices 104 may provision or configure the accounting of the embedded server. Thus, the platform itself (e.g., a virtual server) is provided to the embedded devices (e.g., the edge devices 104). Security and/or Web services (e.g., utilizing REST functionality) may also be provided to the edge devices by the service provider (also referred to herein as the backend server). The embedded CEP platform may be agnostic to the particular backend server or type of backend server that it may communicate with. For example, the embedded CEP platform may communicate with one or more different CEP servers or other types of servers.

Figure 2:
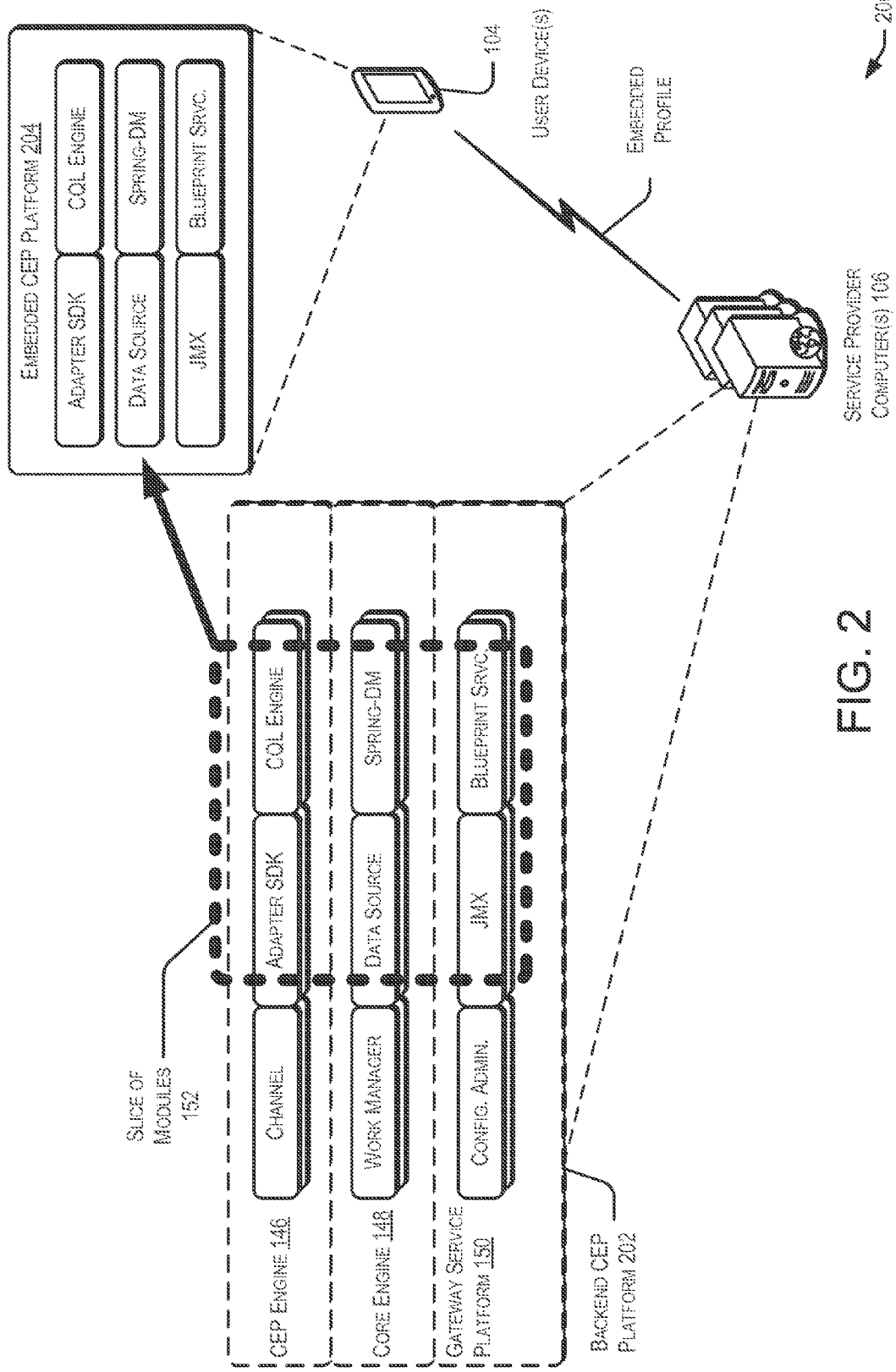
FIG. 2 is a simplified block diagram illustrating at least some features of embedded event processing as described herein, according to at least one example.

FIG. 2 depicts a simplified example system or architecture 200 in which techniques for embedded event processing may be implemented. In architecture 200, one or more edge devices 104 (e.g., an embedded and/or handheld user device) may access the one or more service provider computers 106 via the one or more networks 108 shown in FIG. 1. In some examples, the components of the backend CEP platform 202 may be deployed to the edge devices such that the edge devices are able to implement the embedded CEP platform 204 (e.g., those parts of the slice of modules 152). In some cases, a backplane or bus may be provided for connecting and/or implementing the plurality of modules to be included in each embedded CEP platform 204. Additionally, a Gateway Service Platform (e.g., an Open Source Gateway initiative (OSGi) platform) may be utilized to implement the modular structure of this implementation. In this way, the modules may be bundled using a bus such as the Gateway Service Platform. Additionally, a Gateway Framework 151 that includes at least a service management module, one or more dynamic Java modules (e.g., for bundling), and a Java module may be utilized to enable the different modules (e.g., from the slice of modules 152 for each profile) to communicate with one another and appropriately connect when desired. The backplane enables the modules to be plugged in dynamically once pushed out to the edge devices 104. Further, in some examples, CEP applications of the edge device 104 may be implemented or created on the edge devices 104. Thus, the CEP applications may run on the edge devices 104 and provide stream data from one or more sources (or the CEP application may be the source) to the embedded CEP platform 204. The CEP applications may be plugged into the embedded CEP platform 204 via the bus or in other ways.

In some examples, a bundle order may be implemented for identifying the order of modules for implementing on the edge devices 104. The bundle order may be defined based at least in part on the particular modules that are included in a profile (e.g., those modules of the slice of modules 152) or it may be defined based at least in part on the profile itself. The bundle order may be included with the XML document noted above. The bundle order may also identify the module dependencies (e.g., the dependencies between the individual modules of the slice 152). The bundle order may be a generic library. Once the bundle order is loaded and the profile is successfully implemented, the embedded CEP platform 204 may reference the bundle order to identify the order and dependencies of the modules within the particular profile.

Figure 3:
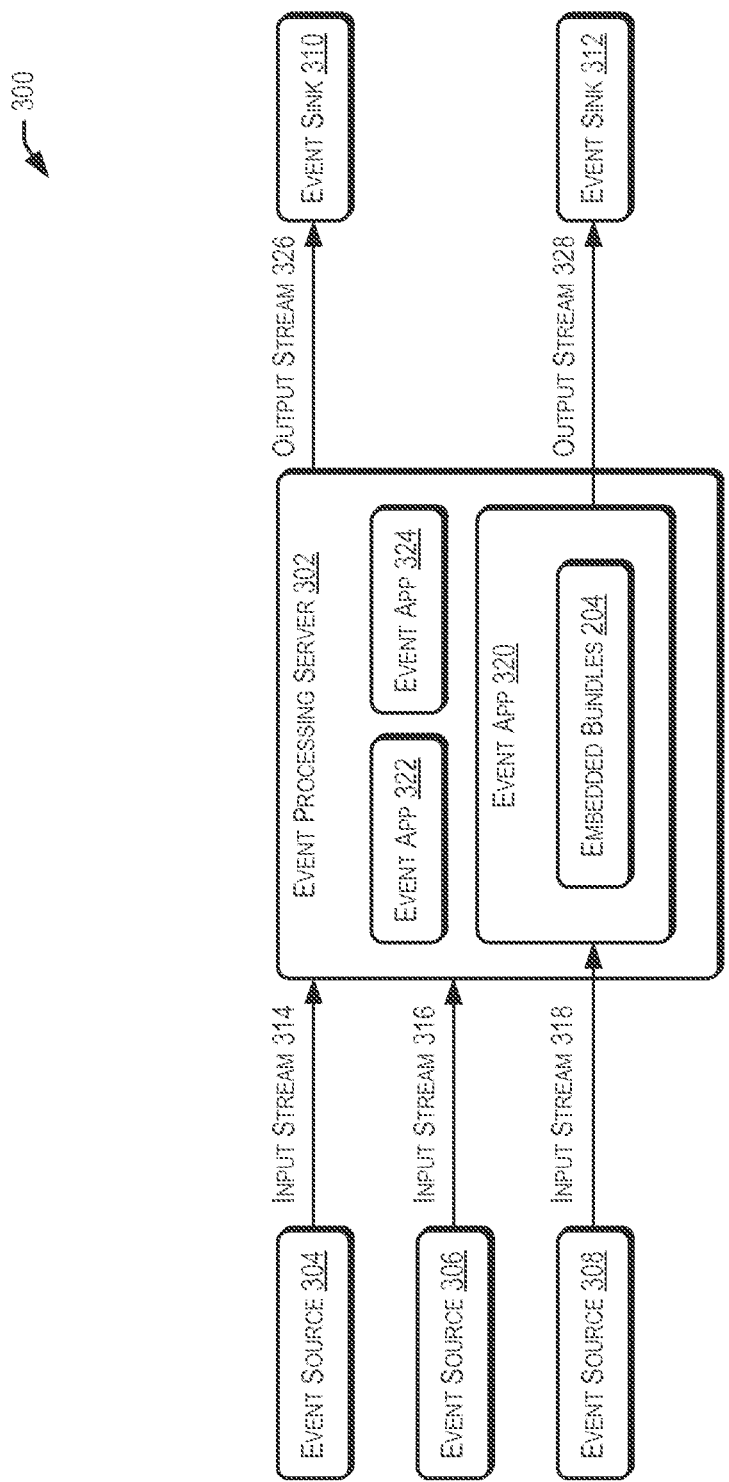
FIG. 3 is a simplified block diagram illustrating at least some features of an event processing engine capable of handling continuous streams of data as described herein, according to at least one example.

FIG. 3 depicts a simplified high level diagram of an event processing system 300 that may incorporate an embodiment of the present disclosure. Event processing system 300 may comprise one or more event sources 304, 306, 308, an event processing server (EPS) 302 that is configured to provide an environment for processing event streams, and one or more event sinks 310, 312. The event sources generate event streams that are received by EPS 302. EPS 302 may receive one or more event streams from one or more event sources 304, 306, 308. For example, as shown in FIG. 2, the EPS 302 receives an input event stream 314 from event source 304, a second input event stream 316 from event source 306, and a third event stream 318 from event source 308. One or more event processing applications 320, 322, and 324 may be deployed on and be executed by the EPS 302. An event processing application (e.g., event application 320) executed by the EPS 302 may be configured to listen to one or more input event streams, process the events received via the one or more event streams based upon processing logic that selects one or more events from the input event streams as notable events. The notable events may then be sent to the one or more event sinks 310, 312 in the form of one or more output event streams. For example, in FIG. 2, the EPS 302 outputs an output event stream 326 to event sink 310, and a second output event stream 328 to event sink 312. In certain embodiments, event sources, event processing applications, and event sinks are decoupled from each other such that one can add or remove any of these components without causing changes to the other components.

In one embodiment, the EPS 302 may be implemented as a Java server comprising a lightweight Java application container, such as one based upon Equinox OSGi, with shared services. In some embodiments, the EPS 302 may support ultra-high throughput and microsecond latency for processing events, for example, by using JRockit Real Time. The EPS 302 may also provide a development platform (e.g., a complete real time end-to-end Java Event-Driven Architecture (EDA) development platform) including tools (e.g., Oracle CEP Visualizer and Oracle CEP IDE) for developing event processing applications.

At least one of the event processing applications 320, 322, 324 is configured to listen to one or more input event streams 314, 316, 318, execute logic (e.g., a query) for selecting one or more notable events from the one or more input event streams, and output the selected notable events to one or more event sinks 310, 312 via the one or more output event streams 326, 328. FIG. 2 provides a drilldown for one such event processing application 320 that may in some examples, be configured to perform the features noted above with respect to the embedded CEP platform 204 of FIG. 2 (e.g., embedded bundles of CEP modules). As shown in FIG. 3, the event processing application 320 is configured to listen to input event stream 318, execute a query via a CQL engine/CQ service comprising logic for selecting one or more notable events from input event stream 318, and output the selected notable events via output event stream 328 to event sink 312. Examples of event sources include, without limitation, an adapter (e.g., JMS, HTTP, and file), a channel, a processor, a table, a cache, or the like. Examples of event sinks include, without limitation, an adapter (e.g., JMS, HTTP, and file), a channel, a processor, a cache, and the like.

Although event processing application 320 in FIG. 3 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by the EPS 302 without having to store all the received event data. Accordingly, the EPS 302 may provide a special querying mechanism that enables processing of events to be performed as the events are received by the EPS 302 without having to store all the received events.

Event-driven applications may be rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with the EPS 302 for a particular event stream may be executed each time that an event is received in that event stream. As part of the continuous query execution, the EPS 302 may evaluate the received event based at least in part on instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more user-defined Java classes may be implemented to partition the notable events based at least in part on attributes of the event data. In some examples, the even data may then be split up into sub-streams based at least in part on the partitioning, and respective sub-streams can be sent to appropriate output channels.

(5) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(6) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, and event types processed by the application. Separate files may be provided for specifying the continuous query or business logic for selection of events.

It should be appreciated that system 300 depicted in FIG. 2 may have other components than those depicted in FIG. 3. Further, the embodiment shown in FIG. 3 is only one example of a system that may incorporate an embodiment of the present disclosure. In some other embodiments, system 300 may have more or fewer components than shown in FIG. 2, may combine two or more components, or may have a different configuration or arrangement of components. System 300 can be of various types including a personal computer, a portable device (e.g., a mobile telephone or device), a workstation, a network computer, a mainframe, a kiosk, a server, or any other data processing system. In some other embodiments, system 300 may be configured as a distributed system where one or more components of system 300 are distributed across one or more networks in the cloud.

The one or more of the components depicted in FIG. 3 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.) of the service provider computers 106 or other computing systems.

Figure 4:
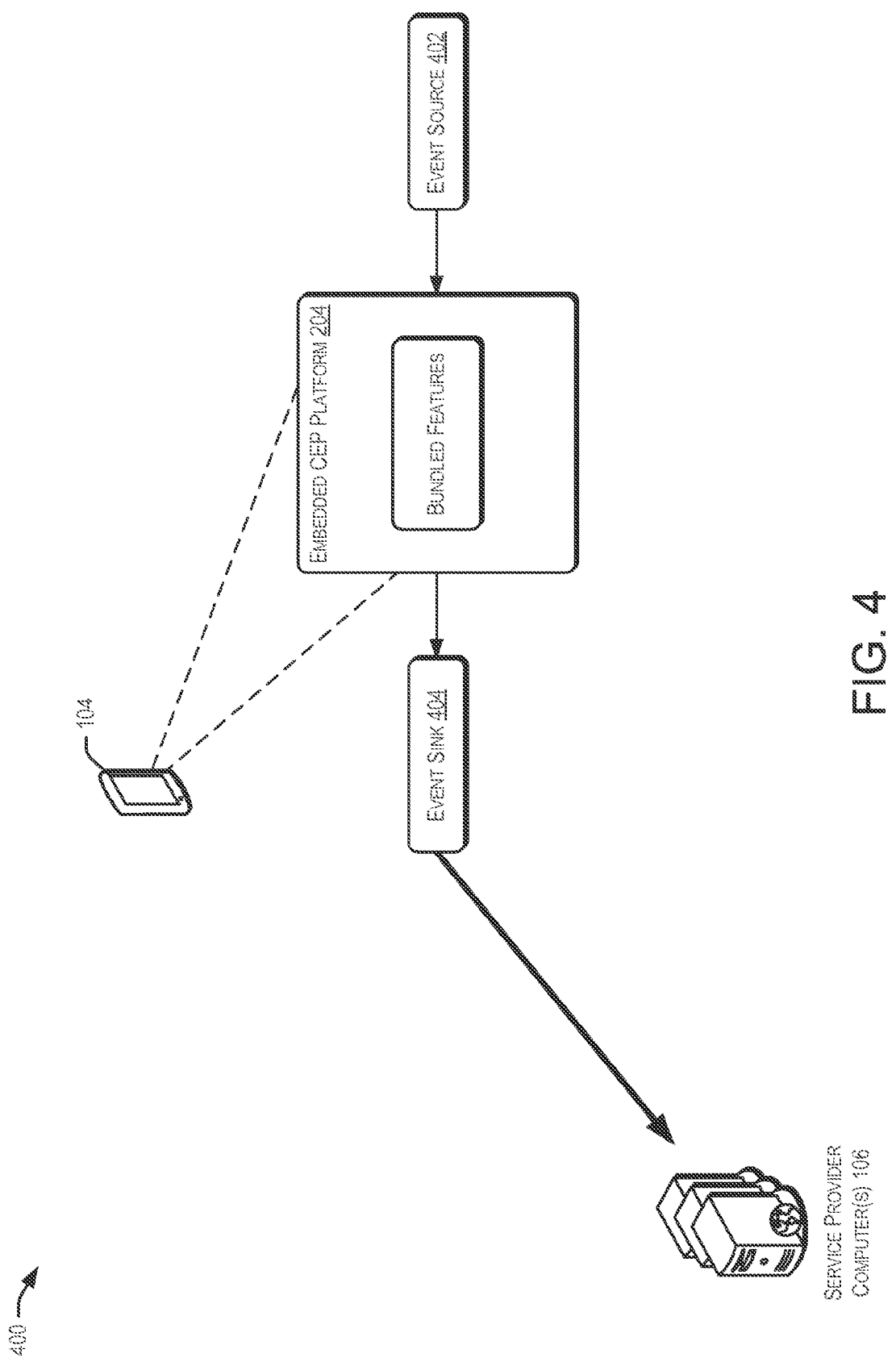
FIG. 4 is a simplified block diagram illustrating at least some features of embedded event processing as described herein, according to at least one example.

FIG. 4 depicts a simplified architecture illustrating additional aspects and/or features of the embedded event processing of FIGS. 1-3. For example, FIG. 4 illustrates an embedded CEP platform 204 (e.g., based at least in part on the slice of modules 152 or some other combination of CEP modules) implemented on an edge device 104 that may include one or more features of the full-feature CEP platform 202 of FIGS. 1 and 2. This embedded CEP platform 204 may include the bundle of features described above and may be based at least in part on a profile for the edge device 104. An event source 402 may provide a stream of data that may be pushed to one or more continuous queries of the embedded CEP platform 204. The bundled features and/or a CQL query may process the stream of data from the event source 402, and provide the output to an event sink 404. This event sink 404 may then become the input stream to the service provider computers 106 and/or any other back-end CEP platform/engine 202.

Figure 5:
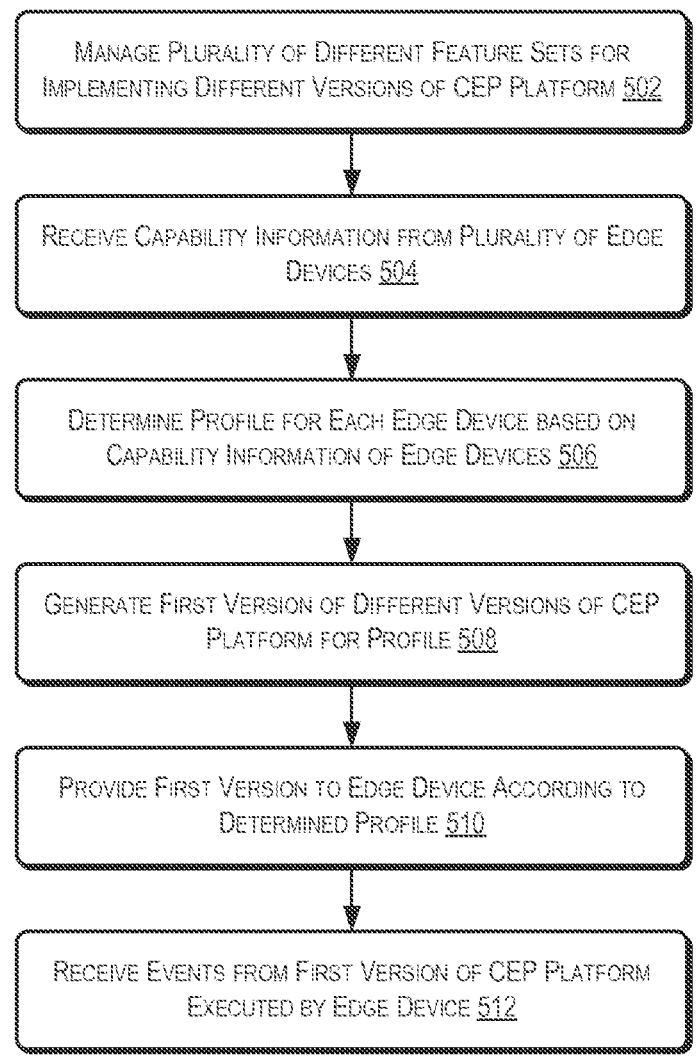
FIG. 5 is a simplified flow diagram illustrating at least one process for implementing the embedded event processing described herein, according to at least one example.
Figure 6:
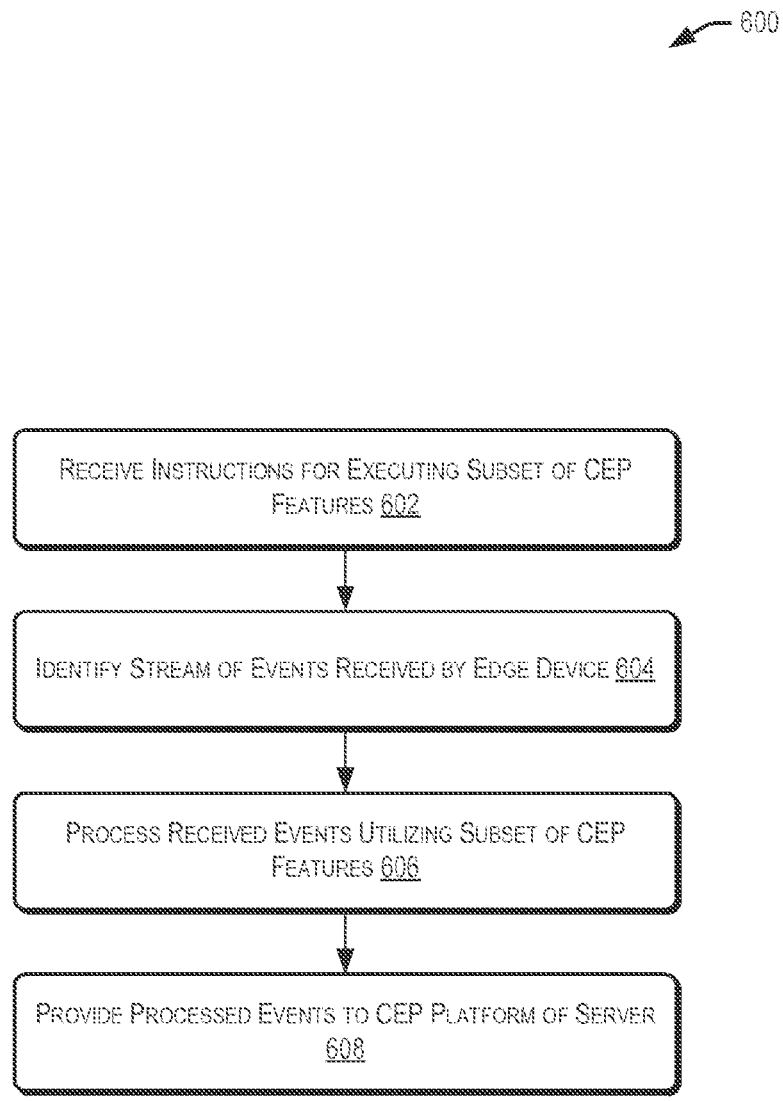
FIG. 6 is a simplified flow diagram illustrating at least one process for implementing the embedded event processing described herein, according to at least one example.

FIGS. 5 and 6 illustrate example flow diagrams showing respective processes 500 and 600 for implementing the embedded event processing described herein. These processes 500, 600 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 106 (e.g., utilizing at least the CEP platform 202) shown in FIGS. 1-4 may perform the process 500 of FIG. 5. The process 500 may begin by managing a plurality of different feature sets for implementing different versions of a complex event processing platform at 502. The processor may also be configured to execute the instructions to receive capability information from a plurality of edge devices 104 at 504. In some aspects, the process may be configured to execute the instructions to determine a profile for each of the plurality of edge devices based at least in part on the capability information of each of the respective plurality of edge devices 104 at 506. The instructions may also be executed to generate at least a first version of the different versions of the complex event processing platform for at least a first determined profile at 508 and provide the first version of the complex event processing platform to a first device of the plurality of edge devices according to the determined profile of the first device at 510. The instructions may also be executed to receive events from the first version of the complex event processing platform executed by the first device at 512.

FIG. 6 illustrates an example flow diagram showing process 600 for implementing the embedded event processing described herein. The one or more edge devices 104 (e.g., utilizing at least the embedded CEP platform 204) shown in FIGS. 1-4 may perform the process 600 of FIG. 6. The process 600 may begin by receiving instructions for executing at least a subset of complex event processing features at 602. The processor of the edge computing device may also identify a stream of events received by the edge computing device at 604. The processor may also process the events of the stream utilizing the subset of complex event processing features at 606. The processor may also provide the processed events to a complex event platform of a server at 608. In some examples, the instructions for executing the subset of the complex event processing features may be received from the server and the processing of the events of the stream may be performed based at least in part on local context information identified by the edge computing device.

Figure 7:
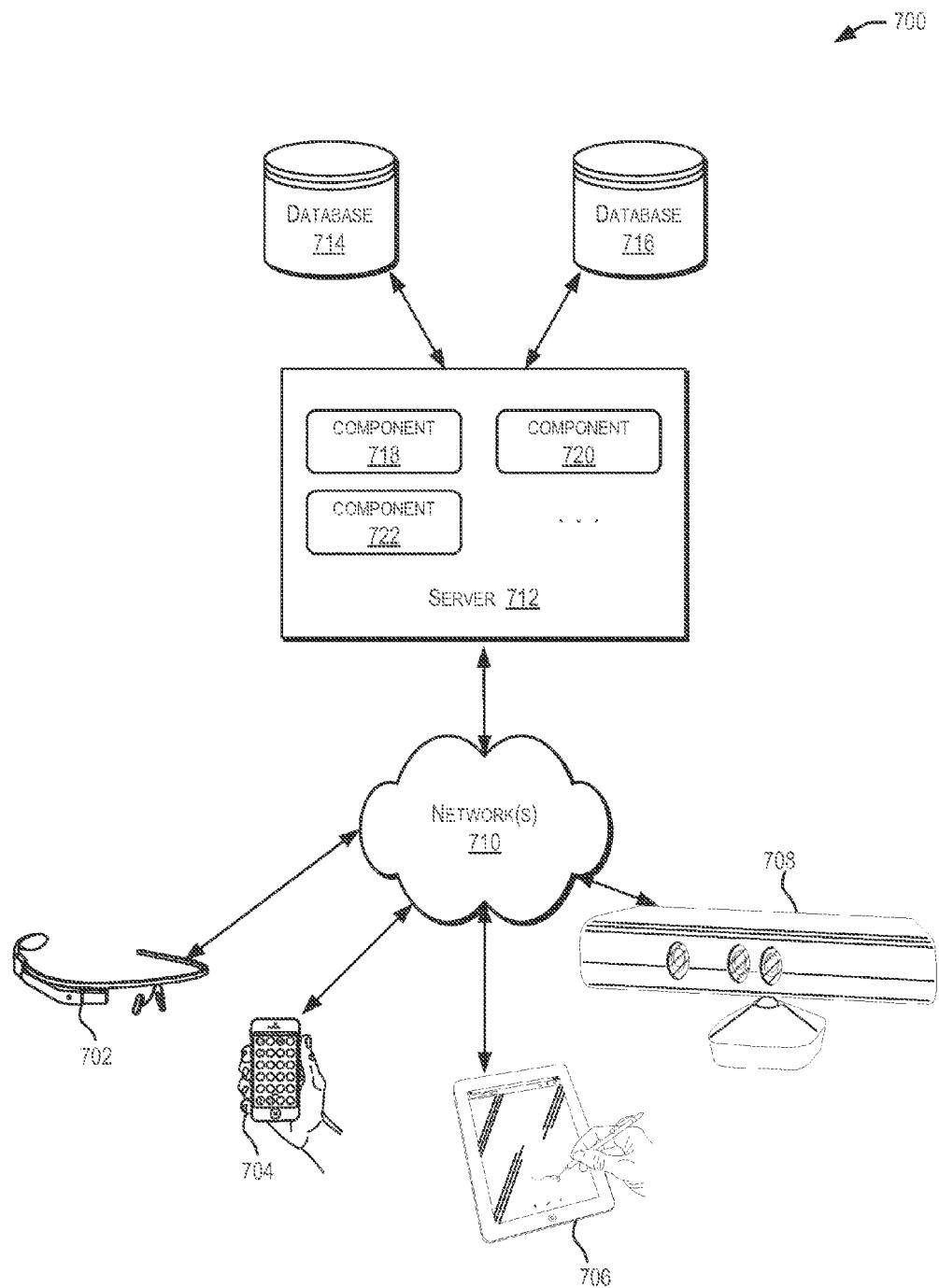
FIG. 7 depicts a simplified diagram of a distributed system for implementing some of the examples described herein, according to at least one example.

FIG. 7 depicts a simplified diagram of a distributed system 700 for implementing one of the embodiments described herein. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, the software components 718, 720, and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the FIG. is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 16, Palm OS, and the like, and being Internet, e-mail, short message service (SMS), Blackberry®, or other communication protocol enabled. The client computing devices can be general purpose personal computers including, by way of example, personal computers, and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, extranet, a public switched telephone network (PSTN), an infra-red network, a wireless network (e.g., a network operating under any of the Institute of Electrical and Electronics (IEEE) 702.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
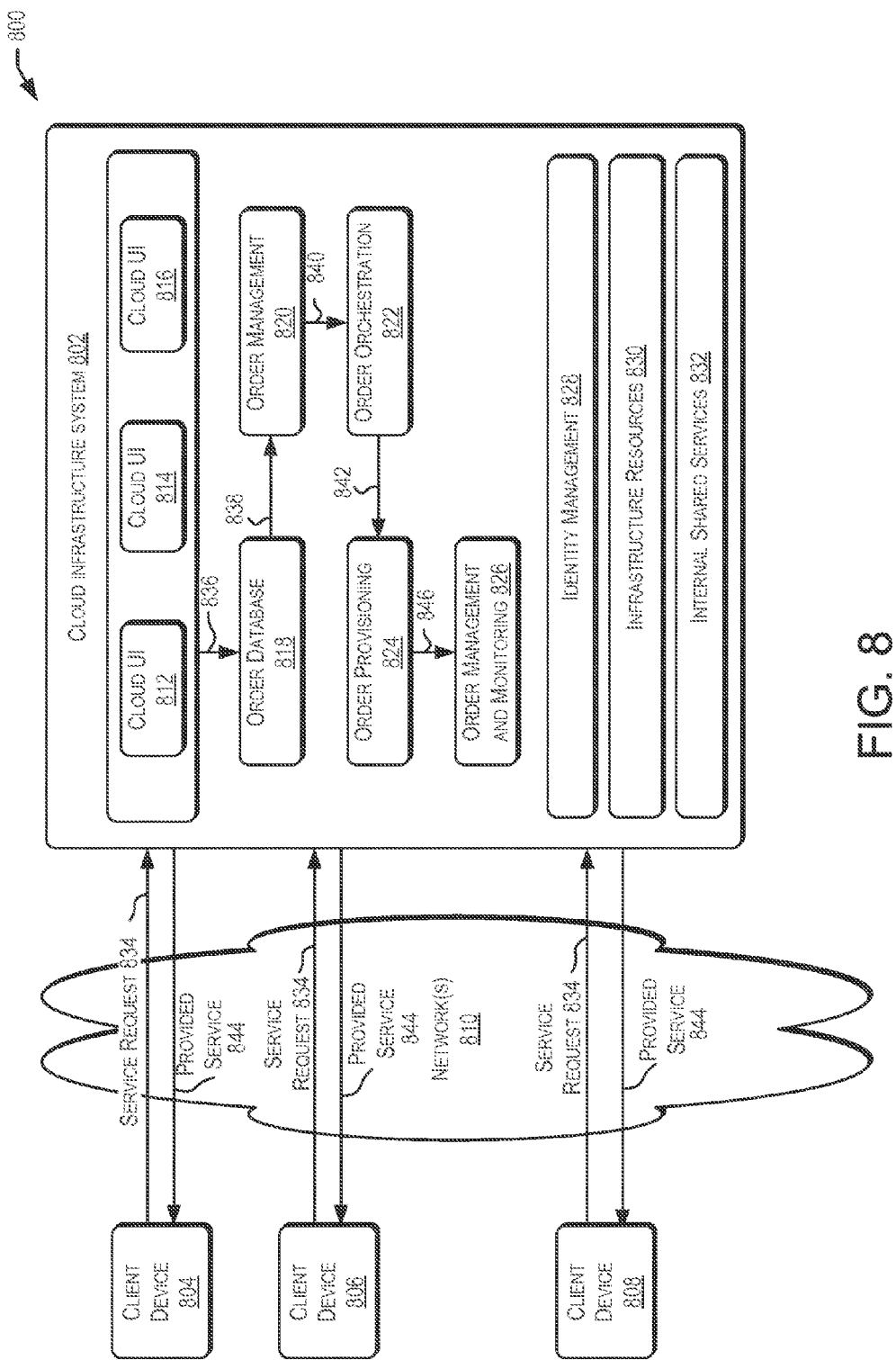
FIG. 8 is a simplified block diagram of components of a system environment by which services provided by the components of an embodiment system may be offered as cloud services, in accordance with some of the examples described herein, according to at least one example.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the FIG. may have other components than those depicted. Further, the embodiment shown in the FIG. is only one example of a cloud infrastructure system that may incorporate an embodiment of the disclosure. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 1410.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage, and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that tall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814, and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814, and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806, and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
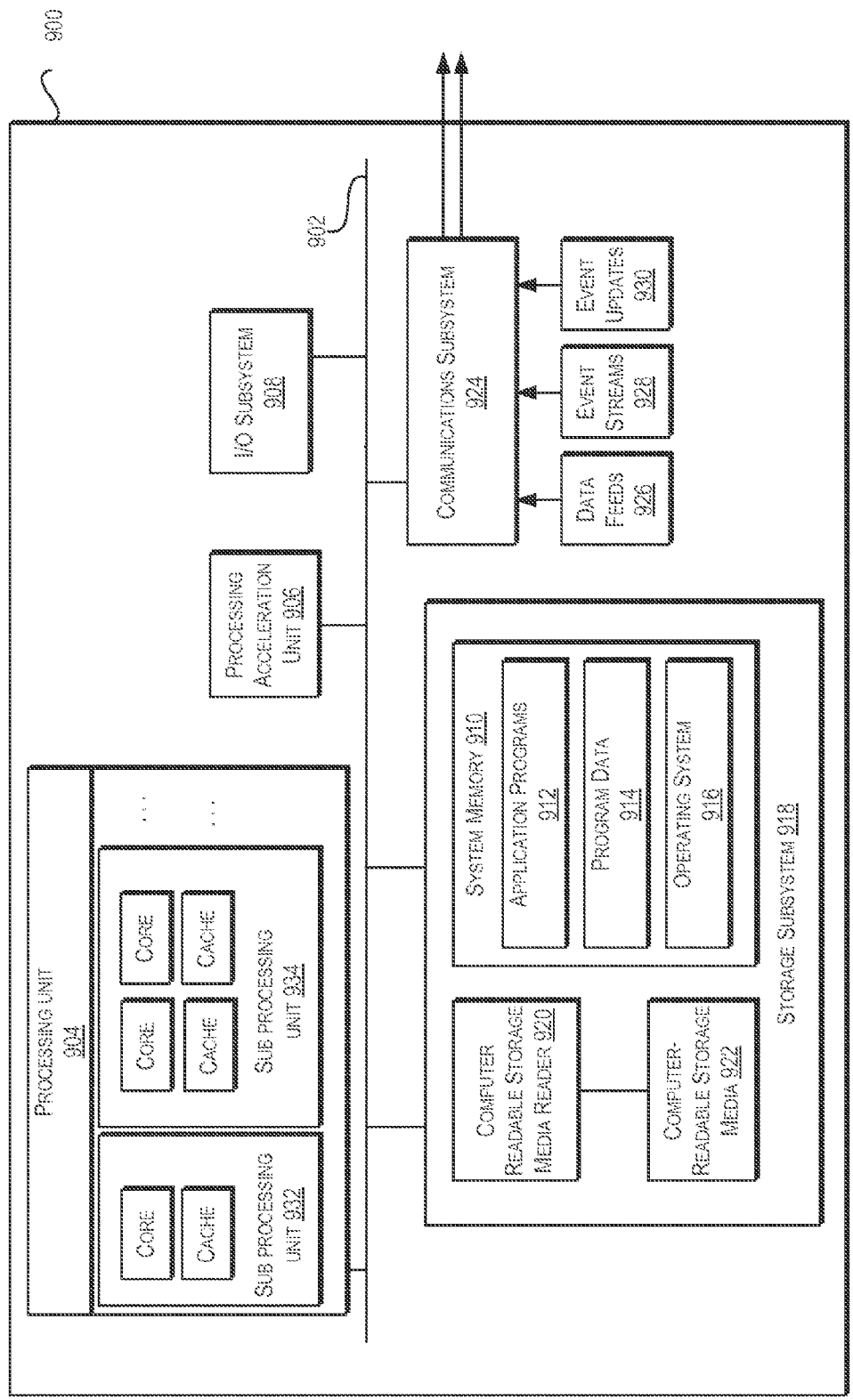
FIG. 9 illustrates an exemplary computer system, in which various embodiments of the present disclosure may be implemented in according with some of the examples described herein, according to at least one example.

FIG. 9 illustrates an exemplary computer system 900, in which various embodiments of the present disclosure may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918, and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 9 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present disclosure.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1402.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in FIG. 9 is intended only as a specific example. Many other configurations having more or fewer components than the system depicted in the FIG. are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A system, comprising:
a memory storing computer-executable instructions; and
a processor configured to access the memory and execute the computer-executable instructions to at least:
manage a plurality of different feature sets for implementing different implementation versions of a complex event processing platform, at least a first subset of the plurality of different feature sets for implementing a first implementation version of the different implementation versions and at least a second subset of the plurality of different feature sets for implementing a second implementation version of the different implementation versions;
receive device capability information from a plurality of edge devices;
determine a device profile for each of the plurality of edge devices based at least in part on the device capability information of each of the respective plurality of edge devices;
generate at least the first implementation version or the second implementation version of the different implementation versions of the complex event processing platform for at least a first determined device profile;
provide the first implementation version of the complex event processing platform to a first device of the plurality of edge devices according to the determined device profile of the first device; and
receive events from the first implementation version of the complex event processing platform executed by the first device.

2. The system of claim 1, wherein the plurality of edge devices comprise at least one of a handheld device, a desktop device, a laptop device, an embedded device, an enterprise device, or a client device.

3. The system of claim 1, wherein at least the first implementation version and the second implementation version of the different implementation versions of the complex event processing platform include different subsets of the plurality of different features sets.

4. The system of claim 1, wherein the first implementation version of the complex event processing platform is provided to the first device, by a device manager, as a set of instructions.

5. The system of claim 4, wherein the set of instructions comprise a bundle order.

6. The system of claim 5, wherein the bundle order identifies at least one of an implementation order or dependencies of the plurality of different feature sets included in the first implementation version of the complex event processing platform provided to the first device.

7. The system of claim 1, wherein the first implementation version of the complex event processing platform enables the first device to implement complex event processing on the events prior to receipt of the events by the system.

8. A computer-implemented method, comprising:
providing, by a processor of an edge computing device, capability information of the edge computing device to a server;
receiving, by the processor of the edge computing device, instructions for executing at least a first subset of complex event processing features, the first subset of complex event processing features corresponding to a first implementation version of a plurality of different implementation versions built based at least in part on the capability information of the edge computing device, the first subset of complex event processing features being different from a second subset of complex event process features of a second implementation version of the plurality of different implementation versions, and the second implementation version configured for a second edge computing device based at least in part on second capability information associated with the second edge computing device;
identifying, by the processor of the edge computing device, a stream of events received by the edge computing device;
processing, by the processor of the edge computing device, the events of the stream utilizing the first subset of complex event processing features; and
providing, by the processor of the edge computing device, the processed events to a complex event platform of the server.

9. The computer-implemented method of 8, wherein the instructions for executing the first subset of the complex event processing features are received from the server.

10. The computer-implemented method of claim 8, wherein the processing of the events of the stream is performed based at least in part on local context information identified by the edge computing device.

11. The computer-implemented method of claim 8, wherein the edge computing device comprises at least one of a handheld device, a desktop device, a laptop device, an embedded device, an enterprise device, or a client device.

12. The computer-implemented method of claim 8, wherein the server is configured to determine a profile for the edge computing device based at least in part on the capability information of the edge computing device.

13. The computer-implemented method of claim 12, further the capability information is provided to the server at least prior to receiving the instructions for executing the first subset of complex event processing features.

14. A non-transitory computer-readable storage medium configured to store computer-executable instructions that, when executed by a computer system, cause the computer system to perform operations comprising:
managing a plurality of different feature sets for implementing different implementation versions of a complex event processing platform, at least a first subset of the plurality of different feature sets for implementing a first implementation version of the different implementation versions and at least a second subset of the plurality of different feature sets for implementing a second implementation version of the different implementation versions;
receiving capability information for a plurality of edge computing devices;
determining a profile for each of the plurality of edge computing devices based at least in part on the capability information of each respective edge device of the plurality of edge computing devices;
generating the first implementation version of the complex event processing platform with limited functionality for the determined profile;
providing the version of the complex event processing platform with limited functionality to the edge computing device for execution; and
enabling the edge computing device to execute the version of the complex event processing platform with limited functionality for processing events received at the edge computing device.

15. The non-transitory computer-readable storage of claim 14, wherein the operations further comprise receiving processed events from the version of the complex event processing platform with limited functionality executed by the edge computing device.

16. The non-transitory computer-readable storage of claim 15, wherein the version of the complex event processing platform with limited functionality enables the edge computing device to implement complex event processing on the events prior to receipt of the events by the computer system.

17. The non-transitory computer-readable storage of claim 14, wherein the version of the complex event processing platform with limited functionality is provided to the edge computing device as a bundle order of instructions.

18. The non-transitory computer-readable storage of claim 17, wherein the bundle order identifies at least one of an implementation order or dependencies of the plurality of different feature sets included in the version of the complex event processing platform with limited functionality provided to the edge computing device.

* * * * *

UNITED STATES PATENT AND TRADEMARK OFFICE
CERTIFICATE OF CORRECTION

PATENT NO. : 9,712,645 B2  
APPLICATION NO. : 14/610971  
DATED : July 18, 2017  
INVENTOR(S) : de Castro Alves et al.

Page 1 of 2

It is certified that error appears in the above-identified patent and that said Letters Patent is hereby corrected as shown below:

On the Title Page

Item (56):

On page 6, Column 1, under Other Publications, Line 24, delete "Actio" and insert -- Action --, therefor.

On page 7, Column 1, under Other Publications, Line 26, delete "Patentabiilty" and insert -- Patentability --, therefor.

On page 7, Column 2, under Other Publications, Line 33, delete "retreived" and insert -- retrieved --, therefor.

On page 8, Column 2, under Other Publications, Line 14, delete "Diad" and insert -- Diao --, therefor.

On page 9, Column 2, under Other Publications, Line 9, delete "@" and insert -- © --, therefor.

On page 10, Column 1, under Other Publications, Line 53, delete "Postgressql," and insert -- Postgresql --, therefor.

On page 10, Column 1, under Other Publications, Line 53, delete "PostgresSQL" and insert -- PostgreSQL --, therefor.

In the Specification

In Column 10, Line 42, delete "(for started)," and insert -- (or started), --, therefor.

In Column 14, Line 10, delete "(2)" and insert -- (3) --, therefor.

In Column 18, Line 15, delete "anon-transitory" and insert -- a non-transitory --, therefor.

Signed and Sealed this  
Thirty-first Day of July, 2018

Andrei Iancu  
*Director of the United States Patent and Trademark Office*

CERTIFICATE OF CORRECTION (continued)
U.S. Pat. No. 9,712,645 B2

In Column 20, Line 32, delete "tall" and insert -- fall --, therefor.

In Column 23, Line 16, delete "industry" and insert -- Industry --, therefor.

In the Claims

In Column 28, Line 18, in Claim 9, after "of" insert -- claim --.